US012691680B2

(12) United States Patent
Sakuma

(10) Patent No.: US 12,691,680 B2
(45) Date of Patent: Jul. 28, 2026

(54) INK JET RECORDING METHOD

(71) Applicant: SEIKO EPSON CORPORATION, Tokyo (JP)

(72) Inventor: Daisuke Sakuma, Minowa (JP)

(73) Assignee: SEIKO EPSON CORPORATION (JP)

( * ) Notice: Subject to any disclaimer, the term of this patent is extended or adjusted under 35 U.S.C. 154(b) by 166 days.

(21) Appl. No.: 18/680,119

(22) Filed: May 31, 2024

(65) Prior Publication Data

US 2024/0399742 A1      Dec. 5, 2024

(30) Foreign Application Priority Data

Jun. 2, 2023    (JP) .................................. 2023-091588

(51) Int. Cl.
*B41J 2/045* (2006.01)
*B41J 2/14* (2006.01)
(Continued)

(52) U.S. Cl.
CPC ............. *B41J 2/04573* (2013.01); *B41J 2/14* (2013.01); *C09D 11/322* (2013.01); *C09D 11/326* (2013.01); *C09D 11/54* (2013.01)

(58) Field of Classification Search
CPC ...... C09D 5/033; C09D 11/322; C09D 11/40; C09D 11/38; C09D 11/54; C09D 11/30;
(Continued)

(56) References Cited

U.S. PATENT DOCUMENTS

2003/0069329 A1*    4/2003   Kubota .................. B41J 2/2114
523/160
2009/0084311 A1*    4/2009   Yoshida ............... B41J 2/14233
118/46
(Continued)

FOREIGN PATENT DOCUMENTS

JP          2016-089288 A      5/2016

*Primary Examiner* — John P Zimmermann
(74) *Attorney, Agent, or Firm* — Harness, Dickey & Pierce, P.L.C.

(57) ABSTRACT

An ink jet recording method including a first ink attachment step of discharging an ink composition containing a self-dispersing pigment by an ink jet method to attach the ink composition to a fabric, a reaction liquid attachment step of discharging a reaction liquid composition containing an aggregating agent that aggregates components of the ink composition by an ink jet method to attach the reaction liquid composition to the fabric, and a second ink attachment step of discharging an ink composition containing a self-dispersing pigment by an ink jet method to attach the ink composition to the fabric, in which the first ink attachment step, the reaction liquid attachment step, and the second ink attachment step are continuously performed in this order, a time difference from when the ink composition is attached by the first ink attachment step to when the reaction liquid composition is attached to a region to which the ink composition is attached by the reaction liquid attachment step is within 45 milliseconds, and a time difference from when the reaction liquid composition is attached by the reaction liquid attachment step to when the ink composition is attached to a region to which the reaction liquid composition is attached by the second ink attachment step is within 45 milliseconds.

11 Claims, 7 Drawing Sheets

(51) Int. Cl.
| | |
|---|---|
| *C09D 11/322* | (2014.01) |
| *C09D 11/326* | (2014.01) |
| *C09D 11/54* | (2014.01) |

(58) Field of Classification Search
CPC ........ A61K 2800/43; A61K 2800/5424; A61K
8/29; A61K 8/14; B41J 2/2114; B41J
2/2107; B41J 2/16552; D21H 23/48;
B41M 5/0017; B41M 5/5218; C08F
222/1006
See application file for complete search history.

(56) References Cited

U.S. PATENT DOCUMENTS

| | | | | |
|---|---|---|---|---|
| 2019/0092958 A1* | 3/2019 | Okuda | .................. | C09D 11/54 |
| 2019/0292391 A1* | 9/2019 | Seguchi | ............... | B41M 7/009 |
| 2021/0062027 A1* | 3/2021 | Watanabe | ............. | C09D 11/54 |
| 2021/0301167 A1* | 9/2021 | Okada | ................. | C09D 11/102 |
| 2022/0410590 A1* | 12/2022 | Yamazaki | ............... | B41J 2/145 |
| 2023/0323149 A1* | 10/2023 | Sakuma | ................ | C09D 11/54 |
| | | | | 347/96 |
| 2024/0010007 A1* | 1/2024 | Koike | .................. | C09D 11/54 |
| 2024/0218593 A1* | 7/2024 | Hirade | ............... | C09D 11/322 |

* cited by examiner

FIG. 3

TABLE 1: REACTION LIQUID COMPOSITION (% BY MASS)

| | | P1-1 | P1-2 | P1-3 | P1-9 | P1-4 | P1-5 | P1-6 | P1-7 | P1-8 |
|---|---|---|---|---|---|---|---|---|---|---|
| POLYVALENT METAL SALT | MAGNESIUM SULFATE | 5.0% | 5.0% | 5.0% | 5.0% | 5.0% | 5.0% | — | — | — |
| CATIONIC RESIN EMULSION | CATIONIC ACRYLIC RESIN (Mowinyl 7800, JAPAN COATING RESIN CORPORATION) | — | — | — | — | — | — | — | 5.0% | — |
| WATER-SOLUBLE CATIONIC RESIN | POLYALLYLAMINE (PAA-HCL-05, NITTOBO MEDICAL CO., LTD.) | — | — | — | — | — | — | — | — | 5.0% |
| ORGANIC ACID | DL-LACTIC ACID | — | — | — | — | — | — | 5.0% | — | — |
| MOISTURIZING AGENT POLYHYDRIC ALCOHOL | GLYCERIN | — | — | 15.0% | 12.0% | 15.0% | 15.0% | 15.0% | 15.0% | 15.0% |
| | PROPYLENE GLYCOL | — | — | 15.0% | 12.0% | 15.0% | 15.0% | 15.0% | 15.0% | 15.0% |
| PENETRATING SOLVENT | TRIETHYLENE GLYCOL MONOBUTYL ETHER | 6.0% | 6.0% | — | 6.0% | — | — | — | — | — |
| | 2-PYRROLIDONE | 24.0% | 24.0% | — | — | — | — | — | — | — |
| | OLFINE E1010 | — | 1.0% | — | 1.0% | 1.0% | — | 1.0% | 1.0% | 1.0% |
| SURFACTANT | PD002W | — | — | — | — | — | 1.0% | — | — | — |
| | SILFACE SAG503A | 1.0% | — | 1.0% | — | — | — | — | — | — |
| ANTIMICROBIAL AGENT | PROXEL XL2 | 0.3% | 0.3% | 0.3% | 0.3% | 0.3% | 0.3% | 0.3% | 0.3% | 0.3% |
| WATER | ION EXCHANGE WATER | REMAINDER | REMAINDER | REMAINDER | REMAINDER | REMAINDER | REMAINDER | REMAINDER | REMAINDER | REMAINDER |
| PHYSICAL PROPERTIES | SURFACE TENSION (mN/m) | 22 | 30 | 22 | 29 | 30 | 28 | 30 | 33 | 33 |
| | PROPORTION OF POLYHYDRIC ALCOHOL IN TOTAL AMOUNT OF ORGANIC SOLVENTS | 0% | 0% | 100% | 80% | 100% | 100% | 100% | 100% | 100% |

*"PERCENT BY MASS" IN THE TABLE INDICATES THE VALUE OF THE ACTIVE COMPONENT CONCENTRATION.

FIG. 4

TABLE 2: INK COMPOSITION

| | (% BY MASS) | Bk2−1 | Bk2−2 | Cy2−1 |
|---|---|---|---|---|
| ANIONIC RESIN | ANIONIC SELF-DISPERSING RESIN EMULSION | POLYCARBONATE-BASED POLYURETHANE (UW1527F, UBE) | 6.0% | 6.0% | 5.0% |
| ANIONIC PIGMENT | ANIONIC SELF-DISPERSING PIGMENT | Black PIGMENT Carbon black | 5.0% | – | – |
| | ANIONIC RESIN DISPERSED PIGMENT | Black PIGMENT Carbon black | – | 5.0% | – |
| | ANIONIC DISPERSANT DISPERSED PIGMENT | Cyan PIGMENT P.B. 15:3 | – | – | 3.5% |
| MOISTURIZING AGENT | GLYCERIN | | 15.0% | 15.0% | 20.0% |
| PENETRATING SOLVENT | TRIETHYLENE GLYCOL MONOBUTYL ETHER | | 2.0% | 2.0% | 2.0% |
| SURFACTANT | OLFINE E1010 | | 1.0% | 1.0% | 1.0% |
| ALKALI | TRIETHANOLAMINE | | 1.0% | 1.0% | 1.0% |
| ANTIMICROBIAL AGENT | PROXEL XL2 | | 0.3% | 0.3% | 0.3% |
| WATER | ION EXCHANGE WATER | | REMAINDER | REMAINDER | REMAINDER |

* "PERCENT BY MASS" IN THE TABLE INDICATES THE VALUE OF THE ACTIVE COMPONENT CONCENTRATION.

FIG. 5

TABLE 3: CLEAR INK COMPOSITION

| | | (% BY MASS) | C3-1 | C3-2 |
|---|---|---|---|---|
| RESIN DISPERSION | ANIONIC | POLYCARBONATE-BASED POLYURETHANE (UW1527F, UBE) | 10.0% | – |
| | NONIONIC | NON-REACTIVE URETHANE RESIN (SUPERFLEX 500M, DKS CO., LTD.) | – | 10.0% |
| MOISTURIZING AGENT | | GLYCERIN | 20.0% | 20.0% |
| PENETRATING SOLVENT | | TRIETHYLENE GLYCOL MONOBUTYL ETHER | 2.0% | 2.0% |
| SURFACTANT | | OLFINE E1010 | 1.0% | 1.0% |
| ALKALI | | TRIETHANOLAMINE | 1.0% | 1.0% |
| ANTIMICROBIAL AGENT | | PROXEL XL2 | 0.3% | 0.3% |
| WATER | | ION EXCHANGE WATER | REMAINDER | REMAINDER |

*"PERCENT BY MASS" IN THE TABLE INDICATES THE VALUE OF THE ACTIVE COMPONENT CONCENTRATION.

FIG. 6
TABLE 4

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| COLOR TYPE/ORDER | 1 | Cy2-1 | Cy2-1 | Cy2-1 | Cy2-1 | Cy2-1 | Cy2-1 | Cy2-1 | Oc |
| | 2 | Bk2-1 | Bk2-1 | Bk2-1 | Bk2-1 | Bk2-1 | Bk2-1 | Bk2-1 | Cy2-1 |
| | 3 | P1-4 | P1-4 | P1-4 | P1-4 | P1-4 | P1-4 | P1-4 | Bk2-1 |
| | 4 | Bk2-1 | Bk2-1 | Bk2-1 | Bk2-1 | Bk2-1 | Bk2-1 | Bk2-1 | P1-4 |
| | 5 | Cy2-1 | Cy2-1 | Cy2-1 | Cy2-1 | Cy2-1 | Cy2-1 | Cy2-1 | Bk2-1 |
| | 6 | C3-1 | C3-1 | C3-1 | C3-1 | C3-1 | C3-1 | C3-1 | Cy2-1 |
| NUMBER INDICATING COLOR TYPE AND ORDER | | BETWEEN 2 AND 3 | BETWEEN 2 AND 3 | BETWEEN 2 AND 3 | BETWEEN 2 AND 3 | BETWEEN 2 AND 3 | BETWEEN 2 AND 3 | BETWEEN 2 AND 3 | BETWEEN 3 AND 4 |
| PT×Bk TIME DIFFERENCE (MILLISECOND) | | 7 | 45 | 7 | 7 | 7 | 7 | 7 | 7 |
| NUMBER INDICATING COLOR TYPE AND ORDER | | BETWEEN 3 AND 4 | BETWEEN 3 AND 4 | BETWEEN 3 AND 4 | BETWEEN 3 AND 4 | BETWEEN 3 AND 4 | BETWEEN 3 AND 4 | BETWEEN 3 AND 4 | BETWEEN 4 AND 5 |
| PT×Bk TIME DIFFERENCE (MILLISECOND) | | 7 | 45 | 7 | 7 | 7 | 7 | 7 | 7 |
| NUMBER INDICATING COLOR TYPE AND ORDER | | BETWEEN 1 AND 2 | BETWEEN 1 AND 2 | BETWEEN 1 AND 2 | BETWEEN 1 AND 2 | BETWEEN 1 AND 2 | BETWEEN 1 AND 2 | BETWEEN 1 AND 2 | BETWEEN 2 AND 3 |
| Bk×Cy TIME DIFFERENCE (MILLISECOND) | | 25 | 25 | 3.5 | 7 | 25 | 45 | 55 | 25 |
| NUMBER INDICATING COLOR TYPE AND ORDER | | BETWEEN 4 AND 5 | BETWEEN 4 AND 5 | BETWEEN 4 AND 5 | BETWEEN 4 AND 5 | BETWEEN 4 AND 5 | BETWEEN 4 AND 5 | BETWEEN 4 AND 5 | BETWEEN 5 AND 6 |
| Bk×Cy TIME DIFFERENCE (MILLISECOND) | | 25 | 25 | 3.5 | 7 | 25 | 45 | 55 | 25 |
| NUMBER INDICATING COLOR TYPE AND ORDER | | BETWEEN 5 AND 6 | BETWEEN 5 AND 6 | BETWEEN 5 AND 6 | BETWEEN 5 AND 6 | BETWEEN 5 AND 6 | BETWEEN 5 AND 6 | BETWEEN 5 AND 6 | BETWEEN 1 AND 2 |
| Cy×Oc TIME DIFFERENCE (MILLISECOND) | | 0.2 | 0.2 | 0.2 | 0.2 | 0.2 | 0.2 | 0.2 | 0.2 |
| DISPERSION FORM OF Bk DISPERSION LIQUID | | SELF-DISPERSION | SELF-DISPERSION | SELF-DISPERSION | SELF-DISPERSION | SELF-DISPERSION | SELF-DISPERSION | SELF-DISPERSION | SELF-DISPERSION |
| COLOR DEVELOPMENT (MIXED Bk OD) | | AAA | B | B | A | AAA | AA | B | A |

FIG. 7

TABLE 5:

| | | EXAMPLE 9 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 |
|---|---|---|---|---|---|---|---|---|---|
| COLOR TYPE/ORDER | 1 | Cy2-1 | Cy2-1 | Cy2-1 | Cy2-1 | BK | Cy2-1 | Bk2-1 | Cy2-1 |
| | 2 | Bk2-1 | Bk2-1 | Bk2-1 | Bk2-1 | Cy2-1 | Bk2-1 | Cy2-1 | Bk2-2 |
| | 3 | P1-4 | P1-4 | P1-4 | P1-4 | P1-4 | P1-4 | P1-4 | P1-4 |
| | 4 | Bk2-1 | Bk2-1 | Bk2-1 | Bk2-1 | Bk2-1 | Cy2-1 | Cy2-1 | Bk2-2 |
| | 5 | Cy2-1 | Cy2-1 | Cy2-1 | Cy2-1 | Cy2-1 | Bk2-1 | Bk2-1 | Cy2-1 |
| | 6 | — | C3-1 | C3-1 | C3-1 | C3-1 | C3-1 | C3-1 | C3-1 |
| NUMBER INDICATING COLOR TYPE AND ORDER | | BETWEEN 2 AND 3 | BETWEEN 2 AND 3 | BETWEEN 2 AND 3 | BETWEEN 2 AND 3 | BETWEEN 1 AND 3 | BETWEEN 2 AND 3 | BETWEEN 1 AND 3 | BETWEEN 2 AND 3 |
| Pt×Bk TIME DIFFERENCE (MILLISECOND) | | 7 | 55 | 45 | 55 | 32 | 7 | 32 | 7 |
| NUMBER INDICATING COLOR TYPE AND ORDER | | BETWEEN 3 AND 4 | BETWEEN 3 AND 4 | BETWEEN 3 AND 4 | BETWEEN 3 AND 4 | BETWEEN 3 AND 4 | BETWEEN 3 AND 5 | BETWEEN 3 AND 5 | BETWEEN 3 AND 4 |
| Pt×Bk TIME DIFFERENCE (MILLISECOND) | | 7 | 55 | 55 | 45 | 7 | 32 | 32 | 7 |
| NUMBER INDICATING COLOR TYPE AND ORDER | | BETWEEN 1 AND 2 | BETWEEN 1 AND 2 | BETWEEN 1 AND 2 | BETWEEN 1 AND 2 | BETWEEN 1 AND 2 | BETWEEN 1 AND 2 | BETWEEN 1 AND 2 | BETWEEN 1 AND 2 |
| Bk×Cy TIME DIFFERENCE (MILLISECOND) | | 25 | 25 | 25 | 25 | 25 | 25 | 25 | 25 |
| NUMBER INDICATING COLOR TYPE AND ORDER | | BETWEEN 4 AND 5 | BETWEEN 4 AND 5 | BETWEEN 4 AND 5 | BETWEEN 4 AND 5 | BETWEEN 4 AND 5 | BETWEEN 4 AND 5 | BETWEEN 4 AND 5 | BETWEEN 4 AND 5 |
| Bk×Cy TIME DIFFERENCE (MILLISECOND) | | 25 | 25 | 25 | 25 | 25 | 25 | 25 | 25 |
| NUMBER INDICATING COLOR TYPE AND ORDER | | — | BETWEEN 5 AND 6 | BETWEEN 5 AND 6 | BETWEEN 5 AND 6 | BETWEEN 5 AND 6 | BETWEEN 5 AND 6 | BETWEEN 5 AND 6 | BETWEEN 5 AND 6 |
| Cy×Oc TIME DIFFERENCE (MILLISECOND) | | — | 0.2 | 0.2 | 0.2 | 0.2 | 0.2 | 0.2 | 0.2 |
| DISPERSION FORM OF Bk DISPERSION LIQUID | | SELF-DISPERSION | SELF-DISPERSION | SELF-DISPERSION | SELF-DISPERSION | SELF-DISPERSION | SELF-DISPERSION | SELF-DISPERSION | RESIN DISPERSION |
| COLOR DEVELOPMENT (MIXED Bk OD) | | AA | C | C | C | C | C | C | C |

INK JET RECORDING METHOD

The present application is based on, and claims priority from JP Application Serial Number 2023-091588, filed Jun. 2, 2023, the disclosure of which is hereby incorporated by reference herein in its entirety.

BACKGROUND

1. Technical Field

The present disclosure relates to an ink jet recording method.

2. Related Art

Attempts are made to apply an ink jet method to not only recording of images on paper and the like, but also textile printing on fabrics, and various ink jet textile printing methods are investigated. An ink jet ink for textile printing contains a coloring material in order to obtain an image having a desired color, and as the coloring material, dyes and pigments are used. In addition, in ink jet textile printing, many investigations are conducted on inks and recording methods.

For example, in ink jet textile printing, pretreatment of fabrics and coating of images are investigated in order to enhance the color developability and fastness of images. For example, JP-A-2016-089288 discloses that a treatment with a pretreatment liquid is attempted in pigment textile printing, and ink is attached without drying the pretreatment liquid.

However, the application of a pretreatment liquid and a coating liquid is often performed by separate apparatuses, and large equipment or a complicated process is required. On the other hand, when an attempt is made to continuously perform attachment of the pretreatment liquid and the coating liquid in the same apparatus, the color developability may be deteriorated in some cases.

SUMMARY

According to an aspect of the present disclosure, there is provided an ink jet recording method including a first ink attachment step of discharging an ink composition containing a self-dispersing pigment by an ink jet method to attach the ink composition to a fabric, a reaction liquid attachment step of discharging a reaction liquid composition containing an aggregating agent that aggregates components of the ink composition by an ink jet method to attach the reaction liquid composition to the fabric, and a second ink attachment step of discharging an ink composition containing a self-dispersing pigment by an ink jet method to attach the ink composition to the fabric, in which the first ink attachment step, the reaction liquid attachment step, and the second ink attachment step are continuously performed in this order, a time difference from when the ink composition is attached by the first ink attachment step to when the reaction liquid composition is attached to a region to which the ink composition is attached by the reaction liquid attachment step is within 45 milliseconds, and a time difference from when the reaction liquid composition is attached by the reaction liquid attachment step to when the ink composition is attached to a region to which the reaction liquid composition is attached by the second ink attachment step is within 45 milliseconds.

BRIEF DESCRIPTION OF THE DRAWINGS

FIG. 3 is Table 1 showing compositions of reaction liquid compositions used in Examples and Comparative Examples.

FIG. 4 is Table 2 showing compositions of ink compositions used in Examples and Comparative Examples.

FIG. 5 is Table 3 showing compositions of clear ink compositions used in Examples and Comparative Examples.

FIG. 6 is Table 4 showing conditions and evaluation results of Examples.

FIG. 7 is Table 5 showing conditions and evaluation results of Examples and Comparative Examples.

DESCRIPTION OF EMBODIMENTS

Figure 1:
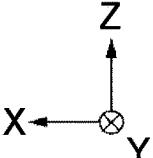
FIG. 1 is a schematic view of an ink jet recording apparatus configured to be applicable to an ink jet recording method according to the present embodiment.

Hereinafter, embodiments of the present disclosure will be described. The embodiments described below describe examples of the present disclosure. The present disclosure is not limited to the following embodiments, and includes various modifications implemented within a range not changing a gist of the present disclosure. It should be noted that not all of the configurations described below are essential configurations of the present disclosure.

1. Ink Jet Recording Method

An ink jet recording method according to the present embodiment includes a first ink attachment step of discharging an ink composition containing a self-dispersing pigment by an ink jet method to attach the ink composition to a fabric, a reaction liquid attachment step of discharging a reaction liquid composition containing an aggregating agent that aggregates components of the ink composition by an ink jet method to attach the reaction liquid composition to the fabric, and a second ink attachment step of discharging an ink composition containing a self-dispersing pigment by an ink jet method to attach the ink composition to the fabric, the first ink attachment step, the reaction liquid attachment step, and the second ink attachment step are continuously performed in this order, a time difference from when the ink composition is attached by the first ink attachment step to when the reaction liquid composition is attached to a region to which the ink composition is attached by the reaction liquid attachment step is within 45 milliseconds, and a time difference from when the reaction liquid composition is attached by the reaction liquid attachment step to when the ink composition is attached to a region to which the reaction liquid composition is attached by the second ink attachment step is within 45 milliseconds.

1.1. First Ink Attachment Step

In the first ink attachment step, an ink composition containing a self-dispersing pigment is discharged by an ink jet method and attached to a fabric.

1.1.1. Ink Composition

The ink composition contains a self-dispersing pigment.

1.1.1. 1 Self-Dispersing Pigment

The self-dispersing pigment contained in the ink composition is not a pigment dispersed by a dispersant or the like, and is a self-dispersing type pigment that can be dispersed without using a dispersant or the like by, for example, modifying the surface of the pigment particles by oxidizing or sulfonating the pigment surface with ozone, hypochlorous acid, fuming sulfuric acid, or the like. Examples of the self-dispersing pigment contained in the ink composition include color pigments such as black, cyan, yellow, magenta, red, green, and orange pigments, and special color pigments such as a white pigment, and self-dispersible pigments can be used.

The self-dispersing pigment may be a mixture. The pigment is excellent in storage stability such as light resistance, weather resistance, and gas resistance, and is preferably an organic pigment from that viewpoint.

Specifically, as the pigment, azo pigments such as insoluble azo pigments, condensed azo pigments, azo lakes, and chelated azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lakes, nitro pigments, nitroso pigments, aniline black, daylight fluorescent pigments, carbon black, and the like can be used. These pigments may be used alone or in combination of two or more thereof. Further, as long as the pigment is self-dispersible, a white pigment, a photoluminescent pigment, or the like may be used.

Although not particularly limited, specific examples of pigments that can be modified in a self-dispersing manner include the following.

Examples of black pigments include No. 2300, No. 900, MCF 88, No. 33, No. 40, No. 45, No. 52, MA7, MA8, MA100, and No. 2200 B (all manufactured by Mitsubishi Chemical Corporation), Raven 5750, Raven 5250, Raven 5000, Raven 3500, Raven 1255, and Raven 700 (all manufactured by Columbia Carbon Inc.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (all manufactured by Degussa).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. Pigment Violet 19, 23, 32, 33, 36, 38, 43, and 50.

Examples of cyan pigments include C.I. Pigment Blue 1, 2, 3, 15, 15: 1, 15: 2, 15: 3, 15: 34, 15: 4, 16, 18, 22, 25, 60, 65, and 66, and C.I. Bat blue 4 and 60.

In addition, pigments other than the magenta, cyan, and yellow pigments are not particularly limited and examples thereof include C.I. Pigment Green 7, 10, C.I. Pigment Brown 3, 5, 25, 26, and C.I. Pigment Orange 1, 2, 5, 7, 13, 14, 15, 16, 24, 34, 36, 38, 40, 43, and 63.

Examples of the white pigment include metal compounds such as metal oxide, barium sulfate, and calcium carbonate. Examples of the metal oxide include titanium dioxide, zinc oxide, silica, alumina, magnesium oxide, and the like. In addition, particles having a hollow structure may be used as the white pigment, and as the particles having a hollow structure, known particles can be used.

The self-dispersing pigment can be stably dispersed in a dispersion medium, and among the above pigments, it is more preferable to use a black pigment in which carbon black is self-dispersible. In addition, since the black color developability is easily deteriorated in pigment textile printing, the effect of improving the color developability can be further enhanced by using the self-dispersing pigment as a black pigment.

The content of the self-dispersing pigment is preferably 0.3% by mass or more and 20% by mass or less, and more preferably 0.5% by mass or more and 15% by mass or less with respect to the total mass of the colored ink composition. Further, the content is preferably 1% by mass or more and 10% by mass or less, and more preferably 2% by mass or more and 7% by mass or less.

In addition, the volume average particle diameter of the self-dispersing pigment particles is preferably 10 nm or more and 300 nm or less, more preferably 30 nm or more and 250 nm or less, even more preferably 50 nm or more and 250 nm or less, and particularly preferably 70 nm or more and 200 nm or less. Further, the volume average particle diameter is preferably 80 nm or more and 150 nm or less.

1.1.1. 2 Other Components

Water

The ink composition may include water. Examples of water include pure water such as ion exchange water, ultrafiltered water, reverse osmosis water, and distilled water, and water such as ultrapure water, from which ionic impurities are removed as much as possible. In addition, when water sterilized by irradiation with ultraviolet rays, addition of hydrogen peroxide, or the like is used, the generation of bacteria or fungi when the composition is stored for a long period of time can be reduced.

The content of water is 30% by mass or more, preferably 40% by mass or more, more preferably 45% by mass or more, and even more preferably 50% by mass or more with respect to the total amount of the ink composition. The term water in the ink composition includes, for example, crystal water included in the raw material or water to be added. When the water content is set to 30% by mass or more, the ink composition can have a relatively low viscosity. Further, the upper limit of the content of water is preferably 90% by mass or less, more preferably 85% by mass or less, and even more preferably 80% by mass or less with respect to the total amount of the ink composition. In the present specification, the term "aqueous composition" refers to a composition containing 30% by mass or more of water with respect to the total mass (100% by mass) of the composition.

Anionic Resin

The ink composition may contain resin particles. The resin particles are preferably anionic resin particles. In addition, the resin particles are preferably self-dispersing type resin particles. The resin particles can further improve the adhesion of an image or the like due to the composition attached to the fabric. As the anionic resin particles, for example, there may be mentioned resin particles having anionic properties among resin particles formed of a urethane-based resin, an acrylic resin (including styrene-acrylic resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene vinyl acetate-based resin, a silicone-acrylic resin, and the like. Among these, a urethane-based resin, a silicone-acrylic resin, an acrylic resin, a polyolefin-based resin, and a polyester-based resin are preferable. These resin particles are often handled in the form of an emulsion, but may be in the form of powder. In addition, the resin particles can be used alone or in combination of two or more thereof.

Urethane-based resin is a generic term for resins having a urethane bond. For the urethane-based resin, a polyether-type urethane resin including an ether bond in the main chain, a polyester-type urethane resin including an ester bond in the main chain, a polycarbonate-type urethane resin including a carbonate bond in the main chain, and the like, in addition to a urethane bond, may be used. In addition, as the urethane-based resin, a commercially available product may be used, and for example, commercially available products such as SUPERFLEX 460, 460s, 840, and E-4000 (trade names, manufactured by DKS Co., Ltd.), RESA-MINE D-1060, D-2020, D-4080, D-4200, D-6300, and D-6455 (trade names, manufactured by Dainichiseika Color & Chemicals Mfg. Co., Ltd.), Takelac WS-6021, and W-512-A-6 (trade names, manufactured by Mitsui Chemicals & SKC Polyurethanes Inc.), Sancure 2710 (trade name, manufactured by Lubrizol Corporation), PERMARIN UA-150 (trade name, manufactured by Sanyo Chemical Industries Ltd.), ETERNACOLL UW series, for example, UW-1527 or the like, (manufactured by UBE Corporation), and the like may be used.

Acrylic resin is a generic term for polymers obtained by polymerizing at least acrylic monomers such as (meth) acrylic acid and (meth)acrylic acid ester as one component, and examples thereof include a resin obtained from an acrylic monomer and a copolymer of an acrylic monomer and other monomers. Examples thereof include an acrylic-vinyl-based resin which is a copolymer of an acrylic mono-mer and a vinyl-based monomer, and the like. In addition, examples of the vinyl-based monomer include styrene and the like.

As the acrylic monomer, acrylamide, acrylonitrile, and the like can also be used. For the resin emulsion using acrylic resin as a raw material, a commercially available product may be used, and for example, any resin emulsion may be selected and used from FK-854 (trade name, manufactured by CHIRIKA Co., Ltd.), Mowinyl 952B, 718A, and 6760 (trade names, manufactured by Japan Coating Resin Corporation), Nipol LX852 and LX874 (trade names, manufactured by Zeon Corporation), and the like.

Incidentally, in the present specification, the acrylic resin may be a styrene-acrylic resin described below. In addition, in the present specification, the notation of "(meth)acrylic" means at least one of acrylic and methacrylic.

The styrene-acrylic resin is a copolymer obtained from a styrene monomer and a (meth)acrylic monomer, and examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. As the styrene-acrylic resin, a com-mercially available product may be used, and for example, Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF SE), Mowinyl 966A and 975N (trade names, manufactured by Japan Coating Resin Corporation), VINYBLAN 2586 (manufactured by Nissin Chemical Industry Co., Ltd.), and the like may be used.

As the silicone-acrylic copolymer resin, a commercially available product can be used. Examples thereof include CHALINE series FE-230N, FE-502, E-370, RU-911, R-170, R170S, LC-190, and R-170BX, manufactured by Nissin Chemical Industry Co., Ltd., SYMAC US-380, SYMAC US-450, and SYMAC US-480, manufactured by Toagosei Co., Ltd., IE-7170, SE 1980 CLEAR, BY22-826EX, and POLON-MF-40, manufactured by Dow Corning Toray Sili-cone Co., Ltd., LEXAN EXL manufactured by SABIC, TARFLON NEO manufactured by Idemitsu Kosan Co., Ltd., Banstar S-806 manufactured by Saiden Chemical Industry Co., Ltd., Mowinyl manufactured by Japan Coating Resin Corporation, COATAX manufactured by Toray Fine Chemicals Co., Ltd., DAITOSOL 5000SJ manufactured by Daito Kasei Kogyo Co., Ltd., YODOSOL GH41 manufac-tured by N.S.C. Japan, an acrylates/ethylhexyl acrylate/ dimethicone methacrylate copolymer (trade name: KP578) manufactured by Shin-Etsu Chemical Co., Ltd., BONCOAT and CERANATE manufactured by DIC Corporation, and acrylic silicone-based emulsions "SIFCLEAR S101" and "SIFCLEAR S102" manufactured by JSR Corporation.

The polyolefin-based resin has an olefin such as ethylene, propylene, or butylene in the structural skeleton, and known ones can be appropriately selected and used. As the olefin resin, a commercially available product can be used, for example, ARROWBASE CB-1200, CD-1200 (trade name, manufactured by Unitika Ltd.), and the like may be used.

In addition, the resin particles may be supplied in the form of an emulsion, and as examples of commercially available products of such a resin emulsion include Microgel E-1002 and E-5002 (trade names, manufactured by Nippon Paint Co. Ltd., styrene-acrylic resin emulsion), VONCOAT 4001 (trade name, manufactured by DIC Corporation, acrylic resin emulsion), VONCOAT 5454 (trade name, manufac-tured by DIC Corporation, styrene-acrylic resin emulsion), Polysol AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate resin emulsion), Polysol AD-13, AD-2, AD-10, AD-96, AD-17, and AD-70 (ethylene vinyl acetate resin emulsion), Polysol PSASE-6010 (ethylene vinyl acetate resin emulsion) (trade names, manufactured by Showa Denko KK), Polysol SAE1014 (trade name, styrene-acrylic resin emulsion, manufactured by Zeon Corporation), Saivinol SK-200 (trade name, acrylic resin emulsion, manu-factured by Saiden Chemical Industry Co., Ltd.), AE-120A (trade name, manufactured by JSR Corporation, acrylic resin emulsion), AE373D (trade name, manufactured by Emul-sion Technology Co., Ltd., carboxy-modified styrene-acrylic resin emulsion), Seikadyne 1900W (trade name, manufac-tured by Dainichiseika Color & Chemicals Mfg. Co., Ltd., ethylene vinyl acetate resin emulsion), VINYBLAN 2682 (acrylic resin emulsion), VINYBLAN 2886 (vinyl acetate acrylic resin emulsion), VINYBLAN 5202 (acetic acid acrylic resin emulsion) (trade names, manufactured by Nis-shin Chemical Industry Co., Ltd.), Elitel KA-5071S, KT-8803, KT-9204, KT-8701, KT-8904, and KT-0507 (trade names, manufactured by Unitika Ltd., polyester resin emul-sion), Hi-Tech SN-2002 (trade name, manufactured by TOHO CHEMICAL INDUSTRY Co., Ltd., polyester resin emulsion), TAKELAK W-6020, W-635, W-6061, W-605, W-635, W-6021, and WS-5100 (trade names, manufactured by Mitsui Chemicals & SKC Polyurethanes Inc., urethane-based resin emulsion), SUPERFLEX 870, 800, 150, 420, 460, 470, 610, and 700 (trade names, manufactured by DKS Co., Ltd., urethane-based resin emulsion), PERMARIN UA-150 (manufactured by Sanyo Chemical Industries, Ltd., urethane-based resin emulsion), Sancure 2710 (manufactured by Japanese Lubrizol Corporation, urethane-based resin emulsion), NeoRez R-9660, R-9637, and R-940 (manufactured by Kusumoto Chemicals, Ltd., urethane-based resin emulsion), ADEKA BONTIGHTER HUX-380 and 290K (manufactured by ADEKA Corporation, urethane-based resin emulsion), Mowinyl 966A and Mowinyl 7320 (manufactured by Japan Coating Resin Corporation), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF SE), NK binder R-5HN (manufactured by Shin-Nakamura Chemical Co., Ltd.), HYDRAN WLS-210 (non-crosslinkable polyurethane: manufactured by DIC Corporation), and Joncryl 7610 (manufactured by BASF SE). Any of these may be selected and used.

The acid value of the resin contained in the resin particles is not particularly limited, and is preferably 1 to 300 KOH mg/g, more preferably 10 to 200 KOH mg/g, and even more preferably 20 to 100 KOH mg/g. When the acid value of the resin is within the above range, there is a tendency that the resin particles are likely to be anionic.

When the ink composition contains anionic resin particles, the content of the resin particles is preferably 20% by mass or more with respect to the total amount of the non-volatile components. The content of the resin particles in the ink composition is more preferably 30% by mass or more, and even more preferably 40% by mass or more with respect to the total amount of the non-volatile components.

When the resin particles are anionic resin particles, the rubbing fastness of the image can be improved and the color developability can be favorably maintained. This is because, when the fixing resin is tried to be blended with the ink composition, it is necessary to reduce the pigment, which is likely to cause deterioration in color developability, but it is not necessary to reduce the pigment by using the fixing resin as an anionic resin particle.

Moisturizing Agent

The ink composition may contain a moisturizing agent. The moisturizing agent is not particularly limited, and examples thereof include glycerin, 2-pyrrolidone, urea, triethanolamine, propylene glycol, 1-(2-hydroxyethyl)-2-pyrrolidone, trimethylolpropane, triethylene glycol, 1,5-pentanediol, triethylene glycol monomethyl ether, and amino coat. Among these, one moisturizing agent can be used alone or two or more thereof can be used in combination.

Other Solvents

The ink composition may include other solvents. It is preferable that the other solvent is an organic solvent having water solubility. One of the functions of the organic solvent is to improve the wettability of the ink composition with respect to a fabric or to enhance the moisture retention properties of the ink composition. The organic solvent can also function as a penetrant.

Examples of the organic solvent include esters, alkylene glycol ethers, cyclic esters, nitrogen-containing solvents, and polyhydric alcohols. Examples of the nitrogen-containing solvents include cyclic amides and acyclic amides. Examples of the acyclic amides include alkoxyalkylamides.

Examples of the esters include glycol monoacetates such as ethylene glycol monomethyl ether acetate, ethylene glycol monoethyl ether acetate, and ethylene glycol monobutyl ether acetate, and glycol diesters such as ethylene glycol diacetate, diethylene glycol diacetate, and propylene glycol diacetate.

The alkylene glycol ethers may be alkylene glycol monoethers or diethers, and alkyl ethers are preferable. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, and triethylene glycol monobutyl ether, and alkylene glycol dialkyl ethers such as ethylene glycol dimethyl ether, ethylene glycol diethyl ether, ethylene glycol dibutyl ether, diethylene glycol dimethyl ether, and diethylene glycol diethyl ether.

Examples of the cyclic esters include cyclic esters (lactones) such as β-propiolactone, γ-butyrolactone, δ-valerolactone, ε-caprolactone, and β-butyrolactone, and compounds in which a hydrogen of a methylene group adjacent to a carbonyl group thereof is substituted with an alkyl group having 1 to 4 carbon atoms.

Examples of the alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, and 3-n-butoxy-N,N-methylethylpropionamide.

Examples of the cyclic amides include lactams, and examples thereof include pyrrolidones such as 2-pyrrolidone, 1-methyl-2-pyrrolidone, 1-ethyl-2-pyrrolidone, 1-propyl-2-pyrrolidone, and 1-butyl-2-pyrrolidone.

In addition, it is also preferable to use compounds represented by Formula (1) as the alkoxyalkylamides.

$$R^1\text{—O—}CH_2CH_2\text{—}(C{=}O)\text{—}NR^2R^3 \qquad (1)$$

In Formula (1), $R^1$ represents an alkyl group having 1 or more and 4 or less carbon atoms, and $R^2$ and $R^3$ each independently represent a methyl group or an ethyl group. The "alkyl group having 1 or more and 4 or less carbon atoms" may be a linear or branched alkyl group, and examples thereof include a methyl group, an ethyl group, an n-propyl group, an iso-propyl group, an n-butyl group, a sec-butyl group, an iso-butyl group, and a tert-butyl group. The compounds represented by Formula (1) may be used alone or as a mixture of two or more thereof.

Examples of the polyhydric alcohols include 1,2-alkanediol (for example, alkanediols such as ethylene glycol, propylene glycol (alias: propane-1,2-diol), 1,2-butanediol, 1,2-pentanediol, 1,2-hexanediol, 1,2-heptanediol, and 1,2-octanediol), and polyhydric alcohols (polyols) excluding the 1,2-alkanediol (for example, diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, and glycerin).

The polyhydric alcohols can be divided into alkanediols and polyols. The alkanediols are diols of an alkane having 5 or more carbon atoms. The number of carbon atoms of the alkane is preferably 5 to 15, more preferably 6 to 10, and even more preferably 6 to 8. 1,2-alkanediol is preferable.

The polyols are polyols of alkane having 4 or less carbon atoms or intermolecular condensates of hydroxyl groups of polyols of alkane having 4 or less carbon atoms. The number of carbon atoms of the alkane is preferably 2 to 3. The number of the hydroxyl groups in the molecule of the polyols is 2 or more, preferably 5 or less, and more preferably 3 or less. When the polyols are the intermolecular condensates described above, the number of intermolecular condensates is 2 or more, preferably 4 or less, and more preferably 3 or less. The polyhydric alcohols may be used alone or as a mixture of two or more types thereof.

The alkanediols and polyols can mainly function as a penetrating solvent and/or a moisturizing solvent. However, the alkanediols tend to have strong properties as the penetrating solvent, and polyols tend to have strong properties as the moisturizing solvent.

The ink composition may contain a surfactant. The surfactant has a function of adjusting the surface tension of the composition and adjusting, for example, the wettability with the fabric. Among the surfactants, for example, an acetylene glycol-based surfactant, a silicone-based surfactant, and a fluorine-based surfactant can be preferably used.

The acetylene glycol-based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products & Chemicals. Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.), and ACETYLENOL E00, EOOP, E40, and E100 (all trade names, manufactured by Kawaken Fine Chemicals Co., Ltd.).

The silicone-based surfactant is not particularly limited, and examples thereof preferably include a polysiloxane-based compound. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, and BYK-348 (all trade names, manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and SILFACE SAG002, 005, 503A, 008 (all trade names, manufactured by Nissin Chemical Industry Co., Ltd.).

As the fluorine-based surfactant, a fluorine-modified polymer is preferably used, and specific examples thereof include BYK-3440 (manufactured by BYK Japan KK.), SURFLON S-241, S-242, and S-243 (all trade names, manufactured by AGC SEIMI CHEMICAL CO., LTD.), and FTERGENT 215M (manufactured by NEOS COMPANY LIMITED).

When the ink composition contains a surfactant, a plurality of types of surfactants may be contained. When the ink composition contains a surfactant, the content thereof can be set to 0.1% by mass or more and 2% by mass or less, preferably 0.3% by mass or more and 1.5% by mass or less, and more preferably 0.4% by mass or more and 1.0% by mass or less with respect to the total mass of the ink composition.

Additive

The ink composition may include an additive. Examples of the additive include a pH adjuster, saccharides, a chelating agent, a preservatives and a fungicide, a rust inhibitor, and others.

The pH adjuster is not particularly limited, and examples thereof include an appropriate combination of acids, bases, weak acids, and weak bases. Examples of acids and bases used in such a combination include inorganic acids such as sulfuric acid, hydrochloric acid, and nitric acid, inorganic bases such as lithium hydroxide, sodium hydroxide, potassium hydroxide, dihydrogen potassium phosphate, hydrogen disodium phosphate, potassium carbonate, sodium carbonate, hydrogen sodium carbonate, and ammonia, organic bases such as triethanol amine, diethanol amine, monoethanol amine, tripropanol amine, triisopropanol amine, diisopropanol amine, and tris(hydroxymethyl)aminomethane (THAM), and organic acids such as adipic acid, citric acid, succinic acid, lactic acid, Good's buffers such as N,N-bis (2-hydroxyethyl)-2-aminoethanesulfonic acid (BES), 4-(2-hydroxyethyl)-1-piperazineethanesulfonic acid (HEPES), morpholinoethanesulfonic acid (MES), carbamoylmethyl iminobisacetic acid (ADA), piperazine-1,4-bis(2-ethanesulfonic acid) (PIPES), N-(2-acetamide)-2-aminoethanesulfonic acid (ACES), cholamine chloride, N-tris(hydroxymethyl)methyl-2-aminoethanesulfonic acid (TES), acetamide glycine, tricine, glycine amide, and bicine, a phosphate buffer solution, a citrate buffer solution, and a tris buffer solution. Further, among these, a tertiary amine such as triethanolamine or triisopropanolamine and a carboxy group-containing organic acid such as adipic acid, citric acid, succinic acid, or lactic acid are preferably contained as a part or the whole of the pH adjuster since the pH buffering effect can be more stably obtained.

Specific examples of saccharides include glucose, mannose, fructose, ribose, xylose, arabinose, galactose, aldonic acid, glucitol (sorbitol), maltose, cellobiose, lactose, sucrose, trehalose, and maltotriose.

Examples of the chelating agent include ethylenediaminetetraacetic acid and salts thereof (such as ethylenediaminetetraacetic acid dihydrogen disodium salt, ethylene diamine nitrilotriacetate, hexametaphosphate, pyrophosphate, and metaphosphate).

Examples of the preservative and the fungicide include sodium benzoate, sodium pentachlorophenolate, sodium 2-pyridinethiol-1-oxide, sodium sorbate, sodium dehydroacetate, PROXEL CRL, PROXEL BDN, PROXEL GXL, PROXEL XL-2, PROXEL IB, and PROXEL TN (trade names, all manufactured by LONZA KK.), and 4-chloro-3-methylphenol (such as PREVENTOL CMK manufactured by Bayer AG).

Examples of the rust inhibitor include benzotriazole, acidic sulfite, sodium thiosulfate, ammonium thioglycolic acid, diisopropylammonium nitrite, pentaerythritol tetranitrate, and dicyclohexylammonium nitrite. Among these, benzotriazole is particularly suitable.

Examples of other additives include a viscosity modifier, an antifungal agent, an antioxidant, and an oxygen absorber.

1.1.1. 3 Manufacturing and Physical Properties

When the ink composition is attached to the fabric by an ink jet method, the viscosity of the composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the ink composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 20 mN/m or more, and more preferably 25 mN/m or more.

The ink composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

The surface tension can be measured by confirming the surface tension when a platinum plate is wetted with the composition in an environment of 25° C. using an automatic surface tensiometer CBVP—Z (manufactured by Kyowa Interface Science, Co., Ltd.).

1.1.2. Attachment Form

The first ink attachment step is performed by an ink jet method. The attachment amount of the ink composition in the ink attachment step is preferably 15 g/m$^2$ or more and 80 g/m$^2$ or less, more preferably 20 g/m$^2$ or more and 40 g/m$^2$ or less, and even more preferably 25 g/m$^2$ or more and 30 g/m$^2$ or less.

1.2. Reaction Liquid Attachment Step

In the reaction liquid attachment step, a reaction liquid composition containing an aggregating agent that aggregates components of the ink composition is discharged by an ink jet method and attached to the fabric.

1.2.1. Reaction Liquid Composition

The reaction liquid composition contains an aggregating agent that aggregates the components in the ink composition.

2.2.1. 1 Aggregating Agent

The reaction liquid composition contains an aggregating agent that aggregates the components of the ink composition. The aggregating agent has an effect of aggregating the pigment and the resin particles by reacting with the components such as the pigment included in the ink composition and the resin particles included in the ink composition and the clear ink composition. For example, due to such aggregation, the color development of the pigment can be enhanced, the fixability of the resin particles can be enhanced, and/or the viscosity of the ink can be increased.

Although the aggregating agent is not particularly limited, examples thereof include a metal salt, an inorganic acid, an organic acid, and a cationic compound, and as the cationic compound, a cationic resin (cationic polymer), a cationic surfactant, and the like can be used. Among these, a polyvalent metal salt is preferable as the metal salt, and a cationic resin is preferable as the cationic compound. Therefore, as the aggregating agent, it is preferable to select any one of a cationic resin, an organic acid, and a polyvalent metal salt from the viewpoint of obtaining particularly excellent image quality, abrasion resistance, gloss, and the like.

The metal salt is preferably a polyvalent metal salt, but metal salts other than polyvalent metal salts can be used. Among these aggregating agents, it is preferable to use at least one selected from a metal salt and an organic acid from the viewpoint of excellent reactivity with components included in the ink. In addition, among the cationic compounds, cationic resins are preferably used from the viewpoint of easy dissolution in the reaction liquid. In addition, a plurality of types of aggregating agents can be used in combination.

The polyvalent metal salt is a compound formed of a divalent or higher metal ion and an anion. Examples of the divalent or higher metal ion include ions such as calcium, magnesium, copper, nickel, zinc, barium, aluminum, titanium, strontium, chromium, cobalt, iron, and the like. Among the metal ions constituting these polyvalent metal salts, the metal ion is preferably at least one of calcium ion and magnesium ion from the viewpoint of excellent aggregation properties of the components of the ink.

The anion constituting the polyvalent metal salt is an inorganic ion or an organic ion. That is, the polyvalent metal salt in the present disclosure is formed of an inorganic ion or an organic ion and a polyvalent metal. Examples of the inorganic ion include a chloride ion, a bromine ion, an iodine ion, a nitrate ion, a sulfate ion, and a hydroxide ion. Examples of the organic ion include an organic acid ion, and examples thereof include a carboxylic acid ion.

The polyvalent metal compound is preferably an ionic polyvalent metal salt, and in particular, when the polyvalent metal salt is a magnesium salt or a calcium salt, the stability of the reaction liquid is further improved. In addition, as the counter ion of the polyvalent metal, any of an inorganic acid ion and an organic acid ion may be used.

Specific examples of the polyvalent metal salt include a calcium carbonate such as a heavy calcium carbonate and a light calcium carbonate, calcium nitrate, calcium chloride, calcium sulfate, magnesium sulfate, calcium hydroxide, magnesium chloride, magnesium carbonate, barium sulfate, chloride barium, zinc carbonate, zinc sulfide, aluminum silicate, calcium silicate, magnesium silicate, copper nitrate, calcium formate, calcium acetate, magnesium acetate, and aluminum acetate. These polyvalent metal salts may be used alone, or may be used in combination of two or more thereof. Among these, since sufficient solubility in water can be secured and the use thereof reduces traces of the reaction liquid (makes traces less visible), at least any one of calcium formate, magnesium sulfate, calcium nitrate, and calcium chloride is preferable, and calcium formate or calcium nitrate is more preferable. In addition, these metal salts may have hydration water in the form of a raw material.

Examples of the metal salt other than the polyvalent metal salt include monovalent metal salts such as sodium salt and potassium salt, and for example, there are mentioned sodium sulfate, and potassium sulfate.

Preferable examples of the organic acid include poly (meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, derivatives of these compounds, and salts thereof. The organic acid may be used alone or in combination of two or more thereof. Metal salts which are salts of organic acids are included in the metal salts described above.

Examples of the inorganic acid include sulfuric acid, hydrochloric acid, nitric acid, and phosphoric acid. The inorganic acid may be used alone or in combination of two or more thereof.

Examples of the cationic resin (cationic polymer) include a cationic acrylic resin, a cationic urethane-based resin, a cationic olefin-based resin, a cationic amine-based resin, and a cationic surfactant. The cationic polymer is preferably water-soluble.

As the cationic acrylic resin, commercially available products can be used, and examples thereof include SUPER-FLEX (registered trademark) 620 and 650, manufactured by DKS Co., Ltd., PARASURF UP-22" manufactured by Ohara Paragium Chemical Co., Ltd., PERMARIN (registered trademark) UC-20 manufactured by Sanyo Chemical Industries, Ltd., ARROWBASE (registered trademark) CB-1200 and CD-1200 manufactured by Unitika, VINYBLAN (registered trademark) 2687 manufactured by Nissin Chemical Industry Co., Ltd., and Mowinyl 7820 manufactured by Japan Coating Resin Corporation.

Commercially available products can be used as the cationic urethane-based resin, and for example, HYDRAN CP-7010, CP-7020, CP-7030, CP-7040, CP-7050, CP-7060, and CP-7610 (trade names, manufactured by DIC Corporation), SUPERFLEX 600, 610, 620, 630, 640, and 650 (trade name, manufactured by DKS Co., Ltd.), urethane emulsion WBR-2120C and WBR-2122C (trade names, manufactured by Taisei Fine Chemical Co., Ltd.), and the like can be used.

The cationic olefin resin is a resin having an olefin such as ethylene and propylene in the structural skeleton, and known ones can be appropriately selected and used. In addition, the cationic olefin resin may be in an emulsion state of being dispersed in a solvent containing water, an organic solvent, or the like. As the cationic olefin resin, a commercially available product can be used, and examples thereof include arrow base CB-1200 and CD-1200 (trade name, manufactured by Unitika Ltd.).

As the cationic amine-based resin (cationic polymer), any resin having an amino group in the structure may be used, and known ones can be appropriately selected and used. Examples thereof include polyamine resin, polyamide resin, polyallylamine resin, and the like. Polyamine resin is a resin having an amino group in the main skeleton of the resin. Polyamide resin is a resin having an amide group in the main skeleton of the resin. Polyallylamine resin is a resin having a structure derived from an allyl group in the main skeleton of the resin.

In addition, as the cationic polyamine-based resin, Unisense KHE103L (hexamethylenediamine/epichlorohydrin resin, 1% aqueous solution of a pH of substantially 5.0, viscosity: 20 to 50 (mPa·s), an aqueous solution with a solid content concentration of 50% by mass) manufactured by Senka Co., Ltd., Unisense KHE104L (dimethylamine/epichlorohydrin resin, 1% aqueous solution of a pH of substantially 7.0, viscosity: 1 to 10 (mPa·s), an aqueous solution with a solid content concentration of 20% by mass), and the like can be used. In addition, specific examples of commercially available products of the cationic polyamine-based resin include FL-14 (manufactured by SNF Co. Ltd.), ARAFIX 100, 251S, 255, and 255LOX (manufactured by Arakawa Chemical Industries, Ltd.), DK-6810, 6853, and 6885; and WS-4010, 4011, 4020, 4024, 4027, and 4030 (manufactured by Seiko PMC Corporation), Papiogen P-105 (manufactured by Senka), Sumirez Resin 650 (30), 675A, 6615, and SLX-1 (manufactured by Taoka Chemical Co., Ltd.), Catiomaster (registered trademark) PD-1, 7, 30, A, PDT-2, PE-10, PE-30, DT-EH, EPA-SK01, and TMHMDA-E (manufactured by Yokkaichi Chemical Company, Limited), and Jetfix 36N, 38A, 5052 (manufactured by Satoda Kako Co., Ltd.).

Examples of the polyamine-based resin include a polyallylamine resin. Examples of the polyallylamine resin include polyallylamine hydrochloride, polyallylamineamide sulfate, allylamine hydrochloride/diallylamine hydrochloride copolymers, allylamine acetate/diallylamine acetate copolymers, allylamine hydrochloride/dimethylallylamine hydrochloride copolymers, allylamine/dimethylallylamine copolymers, polydiallylamine hydrochloride, polymethyldiallylamine hydrochloride, polymethyldiallylamineamide sulfate, polymethyldiallylamine acetate, polydiallyldimethylammonium chloride, diallylamine acetate/sulfur dioxide copolymers, diallylmethylethylammonium ethylsulfate/sulfur dioxide copolymers, methyldiallylamine hydrochloride/sulfur dioxide copolymers, diallyldimethylammonium chloride/sulfur dioxide copolymers, and diallyldimethylammonium chloride/acrylamide copolymers.

Examples of the cationic surfactant include primary, secondary, and tertiary amine salt type compounds, alkylamine salts, dialkylamine salts, aliphatic amine salts, benzalconium salts, quaternary ammonium salts, quaternary alkylammonium salt, alkylpyridinium salt, sulfonium salt, phosphonium salt, onium salt, and imidazolinium salt.

A plurality of types of these aggregating agents may be used. In addition, when at least one of a polyvalent metal salt, an organic acid, and a cationic resin is selected among these aggregating agents, the aggregation action of at least the above-described self-dispersing pigment is more favorable, and thus an image with higher quality (particularly favorable color developability) can be formed.

Although the total content of the aggregating agent in the reaction liquid composition is not particularly limited, the total content of the aggregating agent in the reaction liquid composition is, for example, 0.1% by mass or more and 15% by mass or less, preferably 1% by mass or more and 10% by mass or less, and more preferably 2% by mass or more and 10% by mass or less with respect to the total mass of the reaction liquid composition.

1.2.1. 2 Other Components

The reaction liquid composition may include water, a moisturizing agent, a polyhydric alcohol, other solvents, a surfactant, and an additive. Among these, water, the moisturizing agent, other solvents, the surfactant, and the additive are the same as those of the above-described ink composition, and thus the description thereof will be omitted.

The reaction liquid composition preferably contains a polyhydric alcohol among the other solvents described above. In addition, when the reaction liquid composition contains a polyhydric alcohol, the content of the polyhydric alcohol in the reaction liquid composition is preferably 70% by mass or more, more preferably 80% by mass or more, and even more preferably 85% by mass or more with respect to the total amount of the organic solvents in the reaction liquid composition. Thus, since the permeability of the polyhydric alcohol is low, the reaction liquid composition can more easily remains in the vicinity of the fabric surface, and the color developability of the image can be further improved.

In the reaction liquid composition, the content of the coloring material is preferably 0.1% by mass or less with respect to the total amount of the reaction liquid composition. That is, it is preferable that the reaction liquid composition is not used with the intention of coloring.

1.2.1. 3 Manufacturing and Physical Properties

When the reaction liquid composition is attached to the fabric by an ink jet method, the viscosity of the composition at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the reaction liquid composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 25 mN/m or more, and more preferably 28 mN/m or more. When the surface tension of the reaction liquid composition is high, the reaction liquid composition is less likely to scatter when discharged from the nozzle, mist during discharge is less likely to occur, and thus the discharge stability can be further improved.

The reaction liquid composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.2.2. Attachment Form

The reaction liquid attachment step is performed by an ink jet method. The attachment amount of the reaction liquid composition in the reaction liquid attachment step is preferably 15 g/m$^2$ or more and 80 g/m$^2$ or less, more preferably 30 g/m$^2$ or more and 60 g/m$^2$ or less, and even more preferably 30 g/m$^2$ or more and 50 g/m$^2$ or less.

1.3. Second Ink Attachment Step

In the second ink attachment step, an ink composition containing a self-dispersing pigment is discharged by an ink jet method and attached to the fabric.

1.3.1. Ink Composition

Since the ink composition to be attached to the fabric in the second ink attachment step is the same in components, physical properties, and the like of the ink composition to be attached in the above-described first ink attachment step, the description thereof will be omitted. The ink composition attached to the fabric in the second ink attachment step may be the same as or different from the ink composition to be attached in the above-described first ink attachment step.

1.3.2. Attachment Form

The second ink attachment step is performed by an ink jet method. The attachment amount of the ink composition in the second ink attachment step is preferably 15 g/m$^2$ or more and 80 g/m$^2$ or less, more preferably 20 g/m$^2$ or more and 40 g/m$^2$ or less, and even more preferably 25 g/m$^2$ or more and 30 g/m$^2$ or less.

1.4. Other Steps 1.4.1. Resin Dispersed Pigment Ink Attachment Step

The ink jet recording method of the present embodiment may include a resin dispersed pigment ink attachment step. In the resin dispersed pigment ink attachment step, a resin dispersed pigment ink composition containing a resin dispersed pigment is discharged by an ink jet method and attached to the fabric.

1.4.1. 1 Resin Dispersed Pigment Ink Composition

The resin dispersed pigment ink composition contains a resin dispersed pigment.

1.4.1. 1-1 Resin Dispersed Pigment

The resin dispersed pigment is a pigment obtained by dispersing the pigment of each color described in the above "1. 1. 1. Ink Composition" without making the pigment of each color a self-dispersing type and without using a dispersant. As the dispersant, there is provided a resin dispersant and the like, and the dispersant is selected from those that can achieve favorable dispersion stability of the pigment in the resin dispersed pigment ink composition.

Examples of the resin dispersant (dispersant resin) include (meth)acrylic resins such as poly(meth)acrylic acid, (meth) acrylic acid-acrylonitrile copolymers, (meth)acrylic acid-(meth)acrylic acid ester copolymers, vinyl acetate-(meth) acrylic acid ester copolymers, vinyl acetate-(meth)acrylic acid copolymers, and vinyl naphthalene-(meth)acrylic acid copolymers, and salts thereof; styrene-based resins such as styrene-(meth)acrylic acid copolymers, styrene-(meth) acrylic acid-(meth)acrylic acid ester copolymers, styrene-α-methylstyrene-(meth)acrylic acid copolymers, styrene-α-methylstyrene-(meth)acrylic acid-(meth)acrylic acid ester copolymers, styrene-maleic acid copolymers, and styrene-maleic acid anhydride copolymers, and salts thereof; urethane-based resins, which are polymer compounds (resins)

having a urethane bond formed when an isocyanate group reacts with a hydroxyl group, and which may be linear and/or branched regardless of a crosslinked structure, and salts thereof; polyvinyl alcohols; vinyl naphthalene-maleic acid copolymers and salts thereof; vinyl acetate-maleic acid ester copolymers and salts thereof; and water-soluble resins such as vinyl acetate-crotonic acid copolymers and salts thereof. Among these, a copolymer of a monomer having a hydrophobic functional group and a monomer having a hydrophilic functional group, and a polymer formed of monomers having both a hydrophobic functional group and a hydrophilic functional group are preferable. As the form of the copolymer, any form of a random copolymer, a block copolymer, an alternating copolymer, and a graft copolymer can be used.

Examples of commercially available products of the styrene-based resin dispersant include X-200, X-1, X-205, X-220, and X-228 (manufactured by SEIKO PMC CORPORATION), NOPCOSPERSE (registered trademark) 6100 and 6110 (manufactured by SAN NOPCO LIMITED), Joncryl 67, 586, 611, 678, 680, 682, and 819 (manufactured by BASF SE), DISPER BYK-190 (manufactured by BYK Japan KK.), and N-EA137, N-EA157, N-EA167, N-EA177, N-EA197D, N-EA207D, and E-EN10 (manufactured by DKS Co., Ltd.).

In addition, examples of commercially available products of the acrylic resin dispersants include BYK-187, BYK-190, BYK-191, BYK-194N, and BYK-199 (manufactured by BYK Japan KK.), and Aron A-210, A6114, AS-1100, AS-1800, A-30SL, A-7250, and CL-2 (manufactured by TOAGOSEI CO., LTD.).

Further, examples of commercially available products of the urethane-based resin dispersant include BYK-182, BYK-183, BYK-184, and BYK-185 (manufactured by BYK Japan KK.), TEGO Dispers 710 (manufactured by Evonik Tego Chemi GmbH), and Borchi (registered trademark) Gen 1350 (manufactured by OMG Borchers GmbH).

These dispersants may be used alone or in combination of two or more thereof. The total content of the dispersant is preferably 0.1 parts by mass or more and 30 parts by mass or less, more preferably 0.5 parts by mass or more and 25 parts by mass or less, even more preferably 1 part by mass or more and 20 parts by mass or less, and still even more preferably 1.5 parts by mass or more and 15 parts by mass or less with respect to 50 parts by mass of the pigment. When the content of the dispersant is 0.1 parts by mass or more with respect to 50 parts by mass of the pigment, the dispersion stability of the pigment can be further enhanced. In addition, when the content of the dispersant is 30 parts by mass or less with respect to 50 parts by mass of the pigment, the viscosity of the obtained dispersion can be suppressed to be small.

Among the dispersants exemplified above, it is more preferable that the dispersant is at least one selected from anionic dispersant resins. In addition, in this case, it is more preferable that a weight average molecular weight of the dispersant is 500 or more. Further, the weight average molecular weight is preferably 5,000 or more and 100,000 or less, and more preferably 10,000 or more and 50,000 or less.

By using such a resin dispersant as the dispersant, the dispersion and aggregation properties of the pigment is further improved, and an image having more favorable dispersion stability and more favorable image quality can be obtained.

The anionic dispersant resin is a resin in which the resin has an anionic functional group and exhibits anionic properties. Examples of the anionic functional group include a carboxyl group, a sulfo group, and a phosphoric acid group. Among these groups, a carboxyl group is more preferable.

The dispersant resin preferably has an acid value, and the acid value is preferably 5 mg KOH/g or more, more preferably 10 to 200 mg KOH/g, and even more preferably 15 to 150 mg KOH/g. Further, an acid value of 20 to 100 mg KOH/g is preferable, and an acid value of 25 to 70 mg KOH/g is more preferable.

The acid value can be measured by the neutralization titration method in accordance with JIS K 0070. As a titration device, for example, "AT610" manufactured by Kyoto Electronics Manufacturing Co., Ltd. can be used.

The resin dispersed pigment ink composition is preferably a cyan ink. In a case in which the above-described ink composition is a black ink containing a self-dispersing type black pigment, when the resin dispersed pigment ink composition is used as a cyan ink to form a mixed color black image, the color developability of black can be further improved.

1.4.1. (1-2) Other Components

The resin dispersed pigment ink composition may contain other components. The other components are the same as described in "1.1.1. 2 Other components", and the description thereof will be omitted.

1.4.1. (1-3) Manufacturing and Physical Properties

When the resin dispersed pigment ink composition is attached to the fabric by an ink jet method, the viscosity thereof at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the resin dispersed pigment ink composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 25 mN/m or more, and more preferably 28 mN/m or more. When the surface tension of the resin dispersed pigment ink composition is high, the resin dispersed pigment ink composition is less likely to scatter when discharged from the nozzle, mist during discharge is less likely to occur, and thus the discharge stability can be further improved.

The resin dispersed pigment ink composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.4.1. 2 Attachment Form

The resin dispersed pigment ink attachment step is performed by an ink jet method. The attachment amount of the ink composition in the resin dispersed pigment ink attachment step is preferably 15 g/m$^2$ or more and 80 g/m$^2$ or less, more preferably 20 g/m$^2$ or more and 40 g/m$^2$ or less, and even more preferably 25 g/m$^2$ or more and 30 g/m$^2$ or less.

1.4.2. Clear Ink Attachment Step

The ink jet recording method according to the present embodiment may include a clear ink attachment step. In the clear ink attachment step, a clear ink composition containing resin particles is discharged by an ink jet method and attached to the fabric.

1.4.2. 1 Clear Ink Composition

The clear ink composition contains resin particles (resin dispersion).

1.4.2. 1-1 Resin Particle

Since the resin particles are the same as the anionic resin particles which may be contained in the above-described ink composition, the description thereof will be omitted. When the ink jet recording method includes the clear ink attachment step and the reaction liquid composition and the clear ink composition come into contact with each other, the resin particles contained in the clear ink composition are easily aggregated and are less likely to be sunk inside the fabric, and thus the color developability of an image to be obtained is further improved.

1.4.2. (1-2) Other Components

The clear ink composition may contain other components. The other components are the same as described in "1.1.1. 2 Other components", and the description thereof will be omitted.

In the clear ink composition, the content of the coloring material is preferably 0.1% by mass or less with respect to the total amount of the clear ink composition. That is, it is preferable that the clear ink composition is not used with the intention of coloring.

1.4.2. (1-3) Manufacturing and Physical Properties

When the clear ink composition is attached to the fabric by an ink jet method, the viscosity thereof at 20° C. is preferably 1.5 mPa·s or more and 15 mPa·s or less, more preferably 1.5 mPa·s or more and 7 mPa·s or less, and even more preferably 1.5 mPa·s or more and 5.5 mPa·s or less.

The surface tension of the clear ink composition at 25° C. is 40 mN/m or less, preferably 38 mN/m or less, more preferably 35 mN/m or less, and even more preferably 30 mN/m or less from the viewpoint of ensuring appropriate wet spreadability to the fabric. In addition, the surface tension is preferably 25 mN/m or more, and more preferably 28 mN/m or more. When the surface tension of the clear ink composition is high, the clear ink composition is less likely to scatter when discharged from the nozzle, mist during discharge is less likely to occur, and thus the discharge stability can be further improved.

The clear ink composition is obtained by mixing the components described above in an arbitrary order and, as necessary, carrying out filtration or the like to remove impurities. As a method of mixing each component, a method of sequentially adding materials to a container equipped with a stirring device such as a mechanical stirrer and a magnetic stirrer, and performing stirring and mixing is suitably used. As a filtration method, centrifugal filtration, filter filtration, and the like can be performed as necessary.

1.4.2. 2 Attachment Form

The clear ink attachment step is performed by an ink jet method. The attachment amount of the clear ink composition in the clear ink attachment step is preferably 15 g/m$^2$ or more and 80 g/m$^2$ or less, more preferably 20 g/m$^2$ or more and 40 g/m$^2$ or less, and even more preferably 25 g/m$^2$ or more and 30 g/m$^2$ or less.

1.4.3. Other Steps

Drying Step

The recording method according to the present embodiment may include a drying step between or before and after each step described above. The drying step can be performed by a unit that performs drying using a drying mechanism. Examples of the unit that performs drying using a drying mechanism include a unit that blows normal temperature air or warm air onto the fabric (ventilation type), a unit that irradiates the fabric with radiation (such as infrared rays) which generates heat, (radiation type), a member that comes into contact with the fabric and conducts heat to the fabric (conduction type), and a combination of two or more of these units. When the recording method has the drying step, it is preferable to perform the drying step by a drying mechanism that heats the fabric. A case in which the drying mechanism that heats the fabric is used as the drying mechanism is particularly referred to as a heating step.

The surface temperature of the fabric at the time of attaching each composition to the recording medium is preferably 45° C. or lower, and more preferably 20° C. or higher and 45° C. or lower. Further, the surface temperature is preferably 27.0° C. or higher and 40° C. or lower, and more preferably 28° C. or higher and 30° C. or lower. The temperature is a surface temperature of the portion of the recording surface of the fabric, on which liquid attachment is applied in the attachment step, and is the highest temperature of the attachment step in the recording region. When the surface temperature is within the above range, the surface temperature is more preferably from a viewpoint of image quality, abrasion resistance, and suppression of clogging.

The method of heating the fabric is not particularly limited, and examples thereof include a heat press method, a normal pressure steam method, a high pressure steam method, and a thermofix method. A heat source at the time of heating is not particularly limited, and for example, an infrared lamp and the like can be used. The heating temperature is preferably a temperature at which resin particles in the ink are fused and the medium such as moisture volatilizes. For example, the heating temperature is preferably 100° C. or higher and 200° C. or lower, more preferably 170° C. or lower, and even more preferably 160° C. or lower. Here, the heating temperature in the heating step refers to a surface temperature of an image and the like formed at a fabric. The time for performing heating is not particularly limited, and is, for example, 30 seconds or more and 20 minutes or less.

In addition, it is also preferable not to have a drying step. Accordingly, an image having favorable color development can be obtained in a shorter time.

1.5. Order and Interval of Each Step

In the ink jet recording method according to the present embodiment, the first ink attachment step, the reaction liquid attachment step, and the second ink attachment step are continuously performed in this order. The fact that the steps are continuously performed means that after the ink composition is attached to a predetermined region of the fabric, the reaction liquid composition is attached without attaching compositions other than the reaction liquid composition, and then the ink composition is attached without attaching compositions other than the ink composition.

Further, in the ink jet recording method according to the present embodiment, a time difference from when the ink composition is attached by the first ink attachment step to when the reaction liquid composition is attached to a region to which the ink composition is attached by the reaction liquid attachment step is within 45 milliseconds, and a time difference from when the reaction liquid composition is attached by the reaction liquid attachment step to when the ink composition is attached to a region to which the reaction liquid composition is attached by the second ink attachment step is within 45 milliseconds.

More strictly, the time from when the attachment of the ink composition by the first ink attachment step is completed to when the attachment of the reaction liquid composition onto the region by the reaction liquid attachment step is started is within 45 milliseconds, and the time from when the attachment of the reaction liquid composition by the reaction liquid attachment step is completed to when the attachment of the ink composition onto the region by the second ink attachment step is started is within 45 milliseconds.

By doing so, the ink composition is continuously attached during a very short period of time before and after the reaction liquid is attached to the fabric. Accordingly, the ink composition and the reaction liquid are easily mixed even on the fabric, which is an absorbent recording medium, and the aggregation reaction of the ink composition easily proceeds. Therefore, the pigment in the ink easily remains in the vicinity of the surface of the fabric, and the color developability can be improved. In addition, since the self-dispersing pigment has a higher reactivity with the aggregating agent, the self-dispersing pigment easily remains in the vicinity of the surface and the color developability can be improved.

In addition, when the ink jet recording method includes the resin dispersed pigment ink attachment step, the resin dispersed pigment ink attachment step can be performed at least one of before the first ink attachment step or after the second ink attachment step.

Then, when the resin dispersed pigment ink attachment step is performed before the first ink attachment step, a time difference from when the resin dispersed pigment ink composition is attached by the resin dispersed pigment ink attachment step to when the ink composition is attached to a region to which the resin dispersed pigment ink composition is attached by the first ink attachment step is preferably 3.5 milliseconds or longer, more preferably 7 milliseconds or longer, and even more preferably 7.3 milliseconds or longer.

On the other hand, when the resin dispersed pigment ink attachment step is performed after the second ink attachment step, a time difference from when the ink composition is attached by the second ink attachment step to when the resin dispersed pigment ink composition is attached to a region to which the ink composition is attached by the resin dispersed pigment ink attachment step is preferably 3.5 milliseconds or longer, more preferably 7 milliseconds or longer, and even more preferably 7.3 milliseconds or longer.

In this manner, since the time interval between the attachment of the resin dispersed pigment ink and the attachment of the ink composition is large to some extent, the landed resin dispersed pigment ink droplets are likely to wet and spread and easily fill the image, and thus the color developability is further improved.

Further, when the ink jet recording method includes the resin dispersed pigment ink attachment step and the resin dispersed pigment ink attachment step is performed before the first ink attachment step, a time difference from when the resin dispersed pigment ink composition is attached by the resin dispersed pigment ink attachment step to when the ink composition is attached to a region to which the resin dispersed pigment ink composition is attached by the first ink attachment step is preferably 55 milliseconds or shorter, more preferably 45 milliseconds or shorter, and even more preferably 43 milliseconds or shorter.

On the other hand, when the ink jet recording method includes the resin dispersed pigment ink attachment step and the resin dispersed pigment ink attachment step is performed after the second ink attachment step, a time difference from when the ink composition is attached by the second ink attachment step to when the resin dispersed pigment ink composition is attached to a region to which the ink composition is attached by the resin dispersed pigment ink attachment step is preferably 55 milliseconds or shorter, more preferably 45 milliseconds or shorter, and even more preferably 43 milliseconds or shorter.

In this manner, since the time interval between the attachment of the resin dispersed pigment ink and the attachment of the ink composition is not too long, a distance between the nozzle discharging the resin dispersed pigment ink composition and the nozzle discharging the reaction liquid composition can be increased. Thus, aggregation in the vicinity of the nozzles can be suppressed and the discharge stability can be further improved.

Further, when the ink jet recording method includes the clear ink attachment step, it is preferable that the resin dispersed pigment ink attachment step is performed after the second ink attachment step and after the resin dispersed pigment ink composition is attached by the resin dispersed pigment ink attachment step, the clear ink composition is attached to a region to which the resin dispersed pigment ink composition is attached by the clear ink attachment step.

By doing so, since the image formed by the ink composition or the resin dispersed pigment ink composition is coated with the clear ink composition, the fastness of the image is improved. Further, in order to increase the color developability, a decrease in rubbing fastness due to the coloring material remaining in the vicinity of the surface of the fabric can be reduced.

2. Example of Recording Apparatus

An example of an ink jet textile printing apparatus (recording apparatus) which includes an ink jet head and which is configured to be applicable to the recording method according to the present embodiment will be described with reference to FIG. 1.

In addition, the scales of each layer and each member shown in FIG. 1 are made different from the actual scales thereof so as to be visually recognized in the drawing. In addition, for the convenience of illustration in FIG. 1, as three axes orthogonal to each other, an X axis, a Y axis, and a Z axis are shown, a front end side of each arrow indicating an axial direction shown in the drawing is represented by "+ side", and a base end side thereof is represented by "– side". A direction parallel to the X axis, a direction parallel to the Y axis, and a direction parallel to the Z axis are represented by "X axis direction", "Y axis direction", and "Z axis direction", respectively.

2.1. Overall Schematic Configuration

FIG. 1 is a schematic view showing a schematic overall configuration of a recording apparatus 100. First, the overall configuration of the recording apparatus 100 will be described with reference to FIG. 1.

As shown in FIG. 1, the recording apparatus 100 includes a medium transport portion 20, a medium adhesion portion 60, a belt support portion 91, a print portion 40, a heating unit 27, a washing unit 50, and the like. In the recording apparatus 100, at least one of the medium adhesion portion 60 and the belt support portion 91 corresponds to a heating portion to heat an endless belt 23. In addition, the recording apparatus 100 also includes a control portion 1 to control each of these portions described above. Each portion of the recording apparatus 100 is attached to a frame portion 90.

In addition, when the heating portion to heat the endless belt is provided, the heating portion may be provided upstream than the print portion 40 in the transport direction and may also be provided at a place different from those of the medium adhesion portion 60 and the belt support portion 91. For example, the heating portion may be located upstream than the medium adhesion portion 60 in the transport direction. With such a configuration, the heating portion can also dry the endless belt 23 wetted in the washing. In addition, the heating portion may be a portion to heat the endless belt in a non-contact manner.

The medium transport portion 20 transports the fabric 95 in the transport direction. The medium transport portion 20 includes a medium supply portion 10, transport rollers 21 and 22, the endless belt 23, a belt rotation roller 24, a belt drive roller 25 functioning as a drive roller, transport rollers 26 and 28, and a medium recovery portion 30.

2.2. Medium Transport Portion

First, the transport path of the fabric 95 from the medium supply portion 10 to the medium recovery portion 30 will be described. In addition, in FIG. 1, a direction along a direction in which the gravity works is represented by the Z axis direction, a direction in which the fabric 95 is transported in the print portion 40 is represented by the +X axis direction, and a width direction of the fabric 95 intersecting both the Z axis direction and the X axis direction is represented by the Y axis direction. Further, the positional relationship along the transport direction of the fabric 95 or the moving direction of the endless belt 23 is also represented by "upstream" or "downstream".

The medium supply portion 10 is a portion to supply the fabric 95 on which an image is to be formed to a print portion 40 side. The medium supply portion 10 includes a supply shaft portion 11 and a bearing portion 12. The supply shaft portion 11 is formed to have a cylindrical shape or a columnar shape and is provided to be rotatable in a circumferential direction. The strip-shaped fabric 95 is wound around the supply shaft portion 11 in a roll shape. The supply shaft portion 11 is detachably attached to the bearing portion 12. Accordingly, the fabric 95 wound around the supply shaft portion 11 in advance can be attached to the bearing portion 12 together with the supply shaft portion 11.

The bearing portion 12 rotatably supports both ends of the supply shaft portion 11 in a shaft direction. The medium supply portion 10 includes a rotation drive portion (not shown) that rotatably drives the supply shaft portion 11. The rotation drive portion rotates the supply shaft portion 11 in a direction to which the fabric 95 is supplied. The operation of the rotation drive portion is controlled by the control portion 1. The transport rollers 21 and 22 relay the fabric 95 from the medium supply portion 10 to the endless belt 23.

The endless belt 23 is held between at least two rollers to rotate the endless belt 23, and since the endless belt 23 is rotationally moved, the fabric 95 is transported in the transport direction (+X axis direction) while being supported by the endless belt 23. Specifically, the endless belt 23 is a seamless belt formed such that both end portions of a strip-shaped belt are seamlessly coupled to each other and is set between two rollers of the belt rotation roller 24 and the belt drive roller 25.

The endless belt 23 is held in a state where a predetermined tension is applied thereto so that a portion between the belt rotation roller 24 and the belt drive roller 25 is held flat along the horizontal direction. An adhesive 29 provided for adhesion of the fabric 95 is applied to a surface (support surface) 23a of the endless belt 23. That is, the endless belt 23 is provided with an adhesive layer formed from the adhesive 29. The fabric 95 is attached to the endless belt 23 with the adhesive 29 interposed therebetween. The endless belt 23 supports (holds) the fabric 95 which is supplied from the transport roller 22 and which is in close contact with the adhesive 29 by the medium adhesion portion 60.

The adhesive 29 preferably increases its adhesiveness by heating. Since the adhesive 29 which increases its adhesiveness by heating is used, the fabric 95 can be favorably in close contact with the adhesive layer. As the adhesive 29 as described above, for example, a hot melt-based adhesive having a thermoplastic elastomer SIS (styrene-isoprene-styrene) as a main component may be used.

The belt rotation roller 24 and the belt drive roller 25 support an inner circumferential surface 23*b* of the endless belt 23. Between the belt rotation roller 24 and the belt drive roller 25, a contact portion 69 to support the endless belt 23, the belt support portion 91, and a platen 46 are provided. The contact portion 69 is provided in a region facing a press portion 61 which will be described later with the endless belt 23 interposed therebetween, the platen 46 is provided in a region facing the print portion 40 with the endless belt 23 interposed therebetween, and the belt support portion 91 is provided between the contact portion 69 and the platen 46. Since the contact portion 69, the belt support portion 91, and the platen 46 support the endless belt 23, the endless belt 23 is prevented from being vibrated in conjunction with the movement of the endless belt 23.

The belt drive roller 25 is a drive portion to transport the fabric 95 in the transport direction by rotating the endless belt 23 and has a motor (not shown) to rotationally drive the belt drive roller 25. The belt drive roller 25 is provided downstream than the print portion 40 in the transport direction of the fabric 95, and the belt rotation roller 24 is provided upstream than the print portion 40. When the belt drive roller 25 is rotatably driven, the endless belt 23 is rotated in conjunction with the rotation of the belt drive roller 25, and by the rotation of the endless belt 23, the belt rotation roller 24 is rotated. By the rotation of the endless belt 23, the fabric 95 supported by the endless belt 23 is transported in the transport direction (+X axis direction), and in the print portion 40 which will be described later, an image is formed at the fabric 95.

In the example shown in FIG. 1, the fabric 95 is supported at a side (+Z axis side) at which the surface 23*a* of the endless belt 23 faces the print portion 40 and the fabric 95 is transported together with the endless belt 23 from a belt rotation roller 24 side to a belt drive roller 25 side. In addition, at a side (−Z axis side) at which the surface 23*a* of the endless belt 23 faces the washing unit 50, the endless belt 23 is only moved from the belt drive roller 25 side to the belt rotation roller 24 side.

The transport roller 26 peels away the fabric 95 on which an image is formed from the adhesive 29 provided on the endless belt 23. The transport rollers 26 and 28 relay the fabric 95 from the endless belt 23 to the medium recovery portion 30.

The medium recovery portion 30 recovers the fabric 95 transported from the medium transport portion 20. The medium recovery portion 30 includes a winding shaft portion 31 and a bearing portion 32. The winding shaft portion 31 is formed to have a cylindrical or a columnar shape and is provided to be rotatable in a circumferential direction. The strip-shaped fabric 95 is wound around the winding shaft portion 31 in a roll shape. The winding shaft portion 31 is detachably attached to the bearing portion 32. Accordingly, the fabric 95 wound around the winding shaft portion 31 is removed together with the winding shaft portion 31.

The bearing portion 32 rotatably supports both ends of the winding shaft portion 31 in the shaft direction. The medium recovery portion 30 includes a rotation drive portion (not shown) which rotatably drives the winding shaft portion 31. The rotation drive portion rotates the winding shaft portion 31 in a direction in which the fabric 95 is wound. The operation of the rotation drive portion is controlled by the control portion 1.

Next, the heating portion, the print portion 40, the heating unit 27, and the washing unit 50, which are provided along the medium transport portion 20, will be described.

2.3. Heating Portion

It is preferable that a heater which heats the endless belt 23 is provided in at least one of the contact portion 69 and the belt support portion 91. The heater forms the heating portion. When the heater is provided in the contact portion 69, since a pressing force and heat can be applied to the endless belt 23 by the press portion 61, the adhesion of the fabric 95 to the endless belt 23 can be preferably improved. Accordingly, when being provided in the contact portion 69 or the belt support portion 91, the heater is more preferably provided at the contact portion 69.

The heating portion softens the adhesive layer by heating the adhesive layer to exhibit adhesiveness and improves the adhesion between the fabric 95 and the adhesive layer. Accordingly, the fabric 95 is prevented from being moved on the endless belt 23, and thus, favorable transport accuracy can be obtained.

When the heater is provided in at least one of the contact portion 69 and the belt support portion 91 and the endless belt 23 is heated, the temperature of the surface 23*a* of the endless belt 23 is preferably 80° C. or lower, more preferably 70° C. or lower, and even more preferably 60° C. or lower. When the temperature of the surface 23*a* of the endless belt 23 is within the above range, the reactivity of the resin particles contained in the ink composition is suppressed, and the washing of the belt can be more easily performed in some cases. The lower limit of the temperature of the surface 23*a* of the endless belt 23 is not particularly limited as long as the adhesiveness of the adhesive layer is obtained, and the lower limit is preferably 30° C. or higher, more preferably 35° C. or higher, and even more preferably 40° C. or higher. The temperature of the surface 23*a* of the endless belt 23 can be measured, for example, by a radiation type thermometer, a contact type thermometer, or the like, and the temperature described above is more preferably measured by a radiation type thermometer.

When the heater is provided in at least one of the contact portion 69 and the belt support portion 91, a temperature detection portion (not shown) which detects the surface temperature of the endless belt 23 may be provided. As the temperature detection portion, for example, a thermocouple or the like can be used. Accordingly, since the heater is controlled by the control portion 1 based on the temperature detected by the temperature detection portion, the endless belt 23 can have a predetermined temperature. In addition, the temperature detection portion may use a non-contact type thermometer using infrared rays.

2.4. Print Portion

The print portion 40 is arranged at an upper side (+Z axis side) with respect to the arrangement position of the endless belt 23 and performs printing on the fabric 95 placed on the surface 23*a* of the endless belt 23. The print portion 40 includes an ink jet head 42, a carriage 43 on which the ink jet head 42 is mounted, and a carriage moving portion 45 which moves the carriage 43 in the width direction (Y axis direction) of the fabric 95 intersecting the transport direction.

The ink jet head 42 is a unit that ejects the liquid composition supplied from a liquid cartridge (not shown) from a plurality of nozzles to the fabric 95 under control by the control portion 1 to attach the liquid composition to the fabric. The ink jet head 42 includes a plurality of nozzles discharging the liquid composition to the fabric 95 to which the liquid composition is attached to attach the liquid composition to the fabric 95. The plurality of nozzles are arrayed in a row to form a nozzle row, and the nozzle row is individually arranged corresponding to the liquid composition. The liquid composition are supplied from each liquid cartridge to the ink jet head 42 and are discharged in the form of liquid droplets from the nozzles by an actuator (not shown) provided in the ink jet head 42. The discharged liquid droplets of the liquid composition land on the fabric 95, and an image, a text, a pattern, a color, and the like are formed in the textile printing region of the fabric 95.

The liquid composition referred to here can be the reaction liquid composition, the ink composition, the resin dispersed pigment ink composition, and the clear ink composition described above. Further, the types and number of these liquid compositions can be set appropriately.

Here, in the ink jet head, a piezoelectric element is used as an actuator which is a drive unit, but the method is not limited thereto. For example, an electromechanical conversion element to displace a vibration plate functioning as an actuator by electrostatic adsorption or an electrothermal conversion element to discharge a liquid composition in the form of liquid droplets by air bubbles generated by heating may be used.

Figure 2:
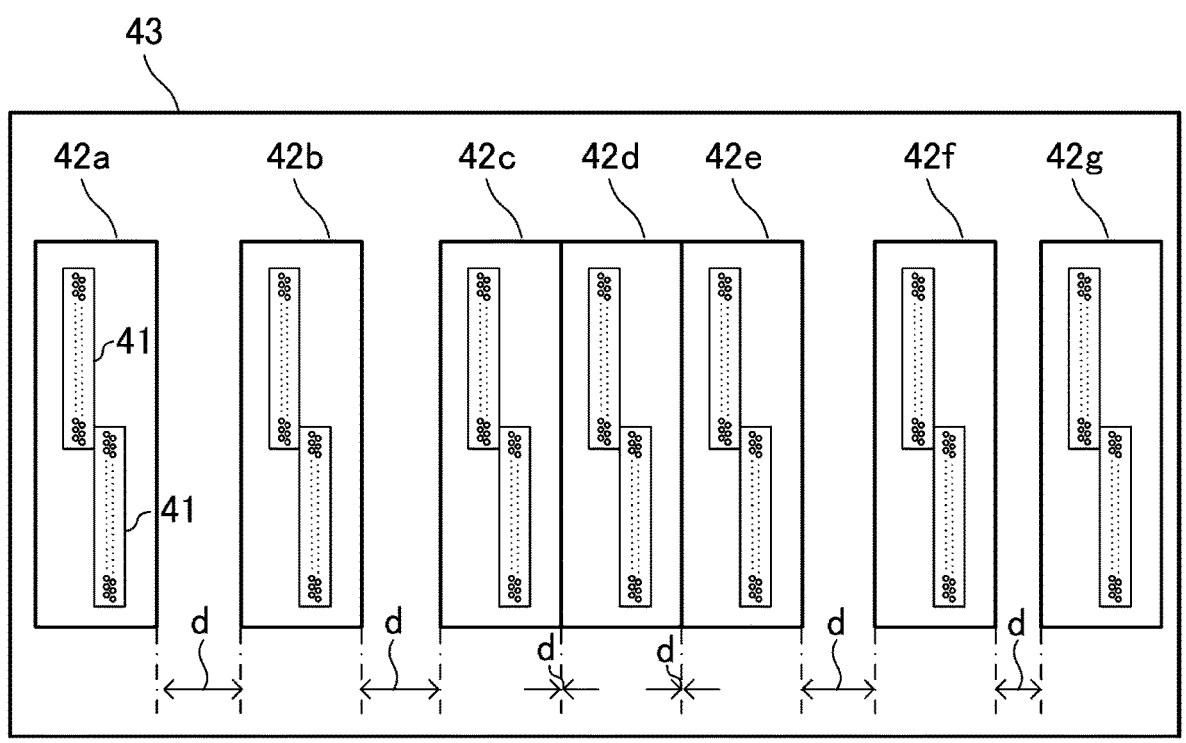
FIG. 2 is a schematic view of an ink jet head of the ink jet recording apparatus.
Figure 2:
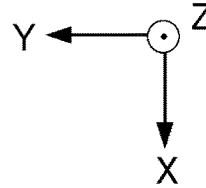

FIG. 2 is a schematic view showing an example of an array of the ink jet heads. In an example in FIG. 2, seven ink jet heads 42a to 42g are mounted on the carriage 43, and each of the seven ink jet heads 42a to 42g has two nozzle rows 41.

In the example in FIG. 2, for example, the ink jet heads can be set such that the composition is not discharged from the ink jet head 42a, the resin dispersed pigment ink composition is discharged from the ink jet head 42b, the ink composition is discharged from the ink jet head 42c, the reaction liquid composition is discharged from the ink jet head 42d, the ink composition is discharged from the ink jet head 42e, the resin dispersed pigment ink composition is discharged from the ink jet head 42f, and the clear ink composition is discharged from the ink jet head 42g.

The arrangement and the number of ink jet heads on the carriage 43 can be changed as appropriate. The time interval for attaching each composition in the ink jet recording method of the present embodiment can be adjusted, for example, by changing an interval d between the ink jet heads. In addition, the time interval between the attachments of each composition can be adjusted by, for example, mounting a large number of ink jet heads on the carriage 43 and depending on the presence or absence of the discharge of the composition from each head.

Each ink jet head can attach each composition to the same region of the fabric at an appropriate timing in one main scanning.

The carriage moving portion 45 is provided on the upper side (+Z axis side) of the endless belt 23. The carriage moving portion 45 has a pair of guide rails 45a and 45b extending along the Y axis direction. The ink jet head 42 is supported by the guide rails 45a and 45b so as to be reciprocally movable along the Y axis direction together with the carriage 43.

The carriage moving portion 45 includes a moving mechanism (not shown) and a power source. As the moving mechanism, for example, a mechanism in which a ball screw and a ball nut are combined, a linear guide mechanism, or the like can be used. The carriage moving portion 45 includes a motor (not shown) as a power source for moving the carriage 43 along the guide rails 45a and 45b. As the motor, various motors such as a stepping motor, a servo motor, and a linear motor can be used. When the motor is driven by the control of the control portion 1, the ink jet head 42 moves in the Y axis direction together with the carriage 43.

2.5. Heating Unit

The heating unit 27 may be provided between the transport roller 26 and the transport roller 28. The heating unit 27 heats the ink composition or the reaction liquid discharged on the fabric 95. Accordingly, there is a tendency that the reaction of the resin particles contained in the ink composition can sufficiently proceed. Since the resin particles sufficiently react, an image having favorable rubbing fastness may be formed in some cases. The heating unit 27 may be used in order to dry drying the fabric 95. In the heating unit 27, for example, an IR heater is contained, and by driving the IR heater, the ink composition and the reaction liquid discharged on the fabric 95 can be made to react to each other in a short time. Accordingly, the strip-shaped fabric 95 on which an image or the like is formed can be wound around the winding shaft portion 31.

2.6. Washing Unit

The washing unit 50 is arranged between the belt rotation roller 24 and the belt drive roller 25 in the X axis direction. The washing unit 50 includes a washing portion 51, a press portion 52, and a movement portion 53. The movement portion 53 integrally moves the washing unit 50 along a floor surface 99 and then fixes the washing unit 50 at a predetermined position.

The press portion 52 is an elevating device formed, for example, of an air cylinder 56 and a ball bush 57 and enables the washing portion 51 provided on the upper side to come into contact with the surface 23a of the endless belt 23. The washing portion 51 is set between the belt rotation roller 24 and the belt drive roller 25 in a state in which a predetermined tension is applied, and washes the surface (support surface) 23a of the endless belt 23 moving from the belt drive roller 25 toward the belt rotation roller 24 from a bottom side (−Z axis direction).

The washing portion 51 includes a washing bath 54, a washing roller 58, and a blade 55. The washing bath 54 is a tank that stores a washing liquid used for washing ink and foreign matter attached to the surface 23a of the endless belt 23, and the washing roller 58 and the blade 55 are provided inside the washing bath 54. As the washing liquid, for example, water or a water-soluble solvent (such as an aqueous alcohol solution) may be used, and as necessary, a surfactant and a defoaming agent may also be added.

When the washing roller 58 is rotated, the washing liquid is supplied to the surface 23a of the endless belt 23, and at the same time, the washing roller 58 and the endless belt 23 are rubbed with each other. Accordingly, the ink composition, the fibers of the fabric 95, and the like attached to the endless belt 23 are removed by the washing roller 58.

The blade 55 may be formed of, for example, a flexible material such as a silicone rubber. The blade 55 is provided downstream than the washing roller 58 in the transport direction of the endless belt 23. Since the endless belt 23 and the blade 55 are rubbed with each other, the washing liquid remaining on the surface 23a of the endless belt 23 is removed.

According to such a recording apparatus 100, the recording method of the present embodiment can be easily performed.

3. Examples and Comparative Examples

Hereinafter, the present disclosure will be specifically described with reference to Examples, and the present disclosure is not limited to these Examples. Hereinafter, "part" and "%" are based on mass unless otherwise specified. Unless otherwise specified, the evaluation was performed in an environment of a temperature of 25° C. and a relative humidity of 40.0%.

3.1. Preparation of Each Composition

The reaction liquid composition, the ink composition, and the clear ink composition were prepared as follows.

3.1.1. Preparation of Reaction Liquid Composition

Each component was put in a container so as to have the composition shown in Table 1, the components were mixed and stirred with a magnetic stirrer for 2 hours, and then the mixture was filtered using a membrane filter having a pore diameter of 5 μm to obtain reaction liquid compositions used in each Example and each Comparative Example. The numerical values in the table represent the solid content.

3.1.2. Preparation of Ink Composition

Each component was put in a container so as to have the composition shown in Table 2, the components were mixed and stirred with a magnetic stirrer for 2 hours, and then the mixture was filtered using a membrane filter having a pore diameter of 5 μm to obtain ink compositions used in each Example and each Comparative Example. The numerical values in the table represent the solid content.

As the anionic self-dispersing pigment, an anionic resin dispersed pigment, and an anionic dispersant dispersed pigment, and a pigment dispersion liquid prepared as follows were used.

Anionic Self-Dispersing Pigment 500 g of carbon black bulk powder prepared by a furnace method (primary particle diameter=18 nm, BET specific surface area=180 m²/g, DBP absorption amount=186 mL/100 g) was added to 3750 g of ion exchange water, and the temperature was raised to 45° C. while stirring using a dissolver. After that, 30000 g of an aqueous solution of sodium hypochlorite (effective chlorine concentration=12%) was added dropwise over 3.5 hours at 45° C. while pulverizing with a sand mill using zirconia beads having a diameter of 0.8 mm. The pulverization with the sand mill was then continued for a further 30 minutes to obtain a reaction liquid containing a self-dispersing type carbon black. The reaction liquid was filtered using 400 mesh wire netting, and thus the zirconia beads and unreacted carbon black were separated from the reaction liquid. A 5% potassium hydroxide aqueous solution was added to the reaction liquid obtained through the separation to adjust the pH to 7.5. Desalination and purification were then carried out using an ultrafilter membrane until the electrical conductivity of the liquid reached 1.5 mS/cm. Desalination and purification were then further carried out using an electrodialyser until the electrical conductivity of the liquid reached 1.0 mS/cm. The liquid was then concentrated until the self-dispersing type carbon black concentration reached 17% by mass. The concentrate was subjected to a centrifugal separator, coarse particles were removed, and filtration was carried out with a 0.6 μm filter. Ion exchange water was added to the filtrate obtained to dilute the filtrate until the self-dispersing type carbon black concentration reached 15% by mass, and dispersion was carried out to obtain self-dispersing pigment dispersion liquid.

Anionic Resin Dispersed Pigment

To 15 parts by mass of carbon black, 10 parts by mass of ammonium salt (weight average molecular weight: 10000) of a styrene-acrylic acid copolymer as a dispersant was added as a polymer component and 55 parts by mass of ion exchange water was added thereto and sufficiently mixed. Then, the mixture was dispersed for 2 hours together with glass beads (diameter: 1.7 mm, 1.5 times the amount of the mixture) in a sand mill (manufactured by Yasukawa Seisakusho Co., Ltd.). After dispersion, the glass beads were removed to obtain a resin dispersed pigment dispersion liquid.

Anionic Dispersant Dispersed Pigment

To 20% by mass of a pigment (C.I. Pigment Blue 15:3) and 7% by mass of a sodium hydroxide neutralized product of a styrene-acrylic acid copolymer (acid value: 175 mg KOH/g, molecular weight: 10000), pure water was added to make the entirety 100% by mass, and the components were stirred and mixed to obtain a mixture. The mixture was placed in a wet sand mill filled with zirconia beads with a diameter of 0.3 mm, and a dispersion treatment was performed for 6 hours. After that, the zirconia beads were removed by a separator and filtered through a cellulose acetate filter having a pore size of 3.0 μm to obtain a pigment dispersion liquid A shown in the table. As the styrene-acrylic acid copolymer, Joncryl 678 (trade name, manufactured by BASF SE) was used. The volume average particle diameter D50 of the pigment in the obtained dispersion liquid was 100 nm.

3.1.3. Preparation of Clear Ink Composition

Each component was put in a container so as to have the composition shown in Table 3, the components were mixed and stirred with a magnetic stirrer for 2 hours, and then the mixture was filtered using a PTFE membrane filter having a pore diameter of 5 μm to obtain clear inks used in each Example and each Comparative Example. The numerical values in the table represent the solid content.

The abbreviations and trade names shown in Tables 1 to 3 are supplemented.

OLFINE E1010 (acetylene glycol-based surfactant manufactured by Nissin Chemical Industry Co., Ltd.)

PD002W (acetylene glycol-based surfactant manufactured by Nissin Chemical Industry Co., Ltd.)

SILFACE SAG503A (silicone-based surfactant, manufactured by Nissin Chemical Industry Co., Ltd.)

PROXEL XL2: preservative, fungicide, manufactured by LONZA KK.)

UW-1527F: ETERNACOLL UW series, urethane-based resin, manufactured by manufactured by UBE Corporation, Ltd.

PB15:3: Cyan pigment C.I. Pigment Blue 15:3

3.2. Evaluation Method 3.2.1. Preparation of Recorded Matter

An apparatus modified from Evo Tre 16 (manufactured by Seiko Epson Corporation) was used for printing. A 100% cotton white broad was used as a recording medium. As an ink jet head, a head unit having a distance between nozzles of 600 dpi in the width direction of the recording medium and 600 nozzles was used.

As the recording conditions, the recording resolution was 1200×600 dpi, and the ink mass per row was 27 g/m². A solid pattern image was formed in an A3 size fabric in 4 passes to obtain a printed textile. The Duty of the solid pattern was 100% in each composition. The printed textile was heat-treated in an oven at 160° C. for 3 minutes and dried.

In addition, the "solid pattern image" means an image in which dots are recorded for all pixels each indicating a minimum recording unit region defined by the recording resolution.

3.2.2. Evaluation of Color Developability

An OD value of black of the textile printed matter in each Example was measured using a fluorescence spectrophotometer ("FD-7", manufactured by Konica Minolta, Inc.) and the color developability were evaluated according to the following criteria. The results are shown in Tables 4 and 5.

AAA: OD value of 1.50 or more

AA: OD value of 1.47 or more and less than 1.50

A: OD value of 1.44 or more and less than 1.47

B: OD value of 1.41 or more and less than 1.44

C: OD value of less than 1.41

3.2.3. Evaluation of Clogging

Evaluation method: After printing continuously for 2 hours on a 100% cotton white broad using the above apparatus, the number of nozzles of the missing color (Bk) was counted using a nozzle check pattern. The results of evaluation are determined according to the following criteria and shown in Table 4 and 5.

AAA: less than 5

AA: 5 or more and less than 10

A: 10 or more and less than 15

B: 15 or more and less than 20

C: 20 or more and less than 30

3.3. Evaluation Results

As seen in each table, in each of Examples in which the first ink attachment step of discharging the ink composition containing the self-dispersing pigment by an ink jet method to attach the ink composition to a fabric, the reaction liquid attachment step of discharging the reaction liquid composition containing the aggregating agent that aggregates components of the ink composition by an ink jet method to attach the reaction liquid composition to the fabric, and the second ink attachment step of discharging the ink composition containing the self-dispersing pigment by the ink jet method to attach the ink composition to the fabric were provided, the first ink attachment step, the reaction liquid attachment step, and the second ink attachment step were continuously performed in this order, the time difference from when the ink composition was attached by the first ink attachment step to when the reaction liquid composition was attached to the region to which the ink composition was attached by the reaction liquid attachment step was within 45 milliseconds, and the time difference from when the reaction liquid composition was attached by the reaction liquid attachment step to when the ink composition was attached to the region to which the reaction liquid composition was attached by the second ink attachment step was within 45 milliseconds, favorable color developability was obtained.

The present disclosure includes a configuration substantially the same as the configuration described in the embodiment, for example, a configuration having the same function, method, and result, or a configuration having the same purpose and effect. Further, the present disclosure includes configurations in which non-essential parts of the configuration described in the embodiments are replaced. In addition, the present disclosure includes configurations that achieve the same effects or configurations that can achieve the same objects as those of the configurations described in the embodiment. Further, the present disclosure includes configurations in which a known technology is added to the configurations described in the embodiments.

The following contents are derived from the above-described embodiments and modification examples.

An ink jet recording method includes a first ink attachment step of discharging an ink composition containing a self-dispersing pigment by an ink jet method to attach the ink composition to a fabric, a reaction liquid attachment step of discharging a reaction liquid composition containing an aggregating agent that aggregates components of the ink composition by an ink jet method to attach the reaction liquid composition to the fabric, and a second ink attachment step of discharging an ink composition containing a self-dispersing pigment by an ink jet method to attach the ink composition to the fabric, in which the first ink attachment step, the reaction liquid attachment step, and the second ink attachment step are continuously performed in this order, a time difference from when the ink composition is attached by the first ink attachment step to when the reaction liquid composition is attached to a region to which the ink composition is attached by the reaction liquid attachment step is within 45 milliseconds, and a time difference from when the reaction liquid composition is attached by the reaction liquid attachment step to when the ink composition is attached to a region to which the reaction liquid composition is attached by the second ink attachment step is within 45 milliseconds.

According to the recording method, the ink composition is continuously attached during a very short period of time before and after the reaction liquid is attached to the fabric. Accordingly, the ink composition and the reaction liquid are easily mixed even on the fabric, which is an absorbent recording medium, and the aggregation reaction of the ink composition easily proceeds. Therefore, the pigment in the ink easily remains in the vicinity of the surface of the fabric, and the color developability can be improved. In addition, since the self-dispersing pigment has a higher reactivity with the aggregating agent, the self-dispersing pigment easily remains in the vicinity of the surface and the color developability can be improved.

In the ink jet recording method, the self-dispersing pigment may be a black pigment.

According to the recording method, since the self-dispersing pigment is a black pigment, the effect of improving the color developability is greater. This is because the color developability of black is easily deteriorated in pigment textile printing.

In the ink jet recording method, the aggregating agent may be selected from a polyvalent metal salt, a cationic resin, and an organic acid.

According to the recording method, the aggregation property of the self-dispersing pigment can be further enhanced.

In the ink jet recording method, the ink composition may further contain resin particles, and the resin particles may be self-dispersing resin particles.

According to the recording method, since the resin particles are self-dispersing resin particles, the rubbing fastness of the image can be improved and the color developability can be favorably maintained. This is because, when the fixing resin is tried to be blended with the ink composition, it is necessary to reduce the pigment, which is likely to cause deterioration in color developability, but it is not necessary to reduce the pigment by using the fixing resin as a self-dispersing resin.

The ink jet recording method may further include a resin dispersed pigment ink attachment step of discharging a resin dispersed pigment ink composition containing a resin dispersed pigment by an ink jet method to attach the resin dispersed pigment ink composition to the fabric, the resin dispersed pigment ink attachment step may be performed at least one of before the first ink attachment step or after the second ink attachment step, a time difference from when the resin dispersed pigment ink composition is attached by the resin dispersed pigment ink attachment step to when the ink composition is attached to a region to which the resin dispersed pigment ink composition is attached by the first ink attachment step may be 7 milliseconds or longer, and a time difference from when the ink composition is attached by the second ink attachment step to when the resin dispersed pigment ink composition is attached to a region to which the ink composition is attached by the resin dispersed pigment ink attachment step may be 7 milliseconds or longer.

According to the recording method, since the time interval between the attachment of the resin dispersed pigment ink and the attachment of the ink composition is large to some extent, the landed resin dispersed pigment ink droplets are likely to wet and spread, the filling of the image is improved, and the color developability is further improved.

The ink jet recording method may further include the time difference from when the resin dispersed pigment ink composition is attached by the resin dispersed pigment ink attachment step to when the ink composition is attached to the region to which the resin dispersed pigment ink composition is attached by the first ink attachment step may be 45 milliseconds or shorter, and the time difference from when the ink composition is attached by the second ink attachment step to when the resin dispersed pigment ink composition is attached to the region to which the ink composition is attached by the resin dispersed pigment ink attachment step may be 45 milliseconds or shorter.

According to this recording method, since the time interval between the attachment of the resin dispersed pigment ink and the attachment of the ink composition is not too long, a distance between the nozzle discharging the resin dispersed pigment ink composition and the nozzle discharging the reaction liquid composition can be increased. Thus, the discharge stability can be further improved.

The ink jet recording method may further include the resin dispersed pigment ink composition may be a cyan ink.

According to the recording method, by using a cyan ink to exhibit mixed black, the color developability of the black can be further improved.

The ink jet recording method further may include a clear ink attachment step of discharging a clear ink composition containing resin particles by an ink jet method to attach the clear ink composition to the fabric, the resin dispersed pigment ink attachment step may be performed after the second ink attachment step, and the resin dispersed pigment ink composition is attached by the resin dispersed pigment ink attachment step, and then the clear ink composition is attached to a region to which the resin dispersed pigment ink composition may be attached by the clear ink attachment step.

According to the recording method, since the image is coated with the clear ink composition, the fastness of the image is improved. Further, in order to increase the color developability, a decrease in rubbing fastness due to the coloring material remaining in the vicinity of the surface of the fabric can be reduced.

The ink jet recording method further may include a clear ink attachment step of discharging a clear ink composition containing resin particles by an ink jet method to attach the clear ink composition to the fabric, the clear ink liquid composition may contain anionic resin particles.

According to the recording method, the clear ink composition is likely to aggregate and is less likely to settle in the fabric, and thus the color developability of the image is further improved.

The ink jet recording method further may include a clear ink attachment step of discharging a clear ink composition containing resin particles by an ink jet method to attach the clear ink composition to the fabric, the reaction liquid composition may contain a polyhydric alcohol, and a content of the polyhydric alcohol in the reaction liquid composition may be 80% by mass or more with respect to a total amount of organic solvents in the reaction liquid composition.

According to the recording method, since the permeability of the polyhydric alcohol is low, the reaction liquid more easily remains in the vicinity of the surface of the fabric, and the color developability of the image can be further improved.

The ink jet recording method further may include a clear ink attachment step of discharging a clear ink composition containing resin particles by an ink jet method to attach the clear ink composition to the fabric, a surface tension of the reaction liquid composition may be 28 mN/m or more.

According to the recording method, the surface tension of the reaction liquid composition is high, the reaction liquid composition is less likely to scatter, and mist during discharge is less likely to occur, and the discharge stability can be further improved.

What is claimed is:

1. An ink jet recording method comprising:

a first ink attachment step of discharging an ink composition containing a self-dispersing pigment by an ink jet method to attach the ink composition to a fabric;

a reaction liquid attachment step of discharging a reaction liquid composition containing an aggregating agent that aggregates components of the ink composition by an ink jet method to attach the reaction liquid composition to the fabric; and a second ink attachment step of discharging an ink composition containing a self-dispersing pigment by an ink jet method to attach the ink composition to the fabric, wherein the first ink attachment step, the reaction liquid attachment step, and the second ink attachment step are continuously performed in this order, a time difference from when the ink composition is attached by the first ink attachment step to when the reaction liquid composition is attached to a region to which the ink composition is attached by the reaction liquid attachment step is within 45 milliseconds, and a time difference from when the reaction liquid composition is attached by the reaction liquid attachment step to when the ink composition is attached to a region to which the reaction liquid composition is attached by the second ink attachment step is within 45 milliseconds.

2. The ink jet recording method according to claim 1, wherein the self-dispersing pigment is a black pigment.

3. The ink jet recording method according to claim 1, wherein the aggregating agent is selected from a polyvalent metal salt, a cationic resin, and an organic acid.

4. The ink jet recording method according to claim 1, wherein the ink composition further contains resin particles, and the resin particles are self-dispersing resin particles.

5. The ink jet recording method according to claim 1, further comprising:

a resin dispersed pigment ink attachment step of discharging a resin dispersed pigment ink composition containing a resin dispersed pigment by an ink jet method to attach the resin dispersed pigment ink composition to the fabric, wherein the resin dispersed pigment ink attachment step is performed at least one of before the first ink attachment step or after the second ink attachment step, a time difference from when the resin dispersed pigment ink composition is attached by the resin dispersed pigment ink attachment step to when the ink composition is attached to a region to which the resin dispersed pigment ink composition is attached by the first ink attachment step is 7 milliseconds or longer, and a time difference from when the ink composition is attached by the second ink attachment step to when the resin dispersed pigment ink composition is attached to a region to which the ink composition is attached by the resin dispersed pigment ink attachment step is 7 milliseconds or longer.

6. The ink jet recording method according to claim 5, wherein the time difference from when the resin dispersed pigment ink composition is attached by the resin dispersed pigment ink attachment step to when the ink composition is attached to the region to which the resin dispersed pigment ink composition is attached by the first ink attachment step is 45 milliseconds or shorter, and the time difference from when the ink composition is attached by the second ink attachment step to when the resin dispersed pigment ink composition is attached to the region to which the ink composition is attached by the resin dispersed pigment ink attachment step is 45 milliseconds or shorter.

7. The ink jet recording method according to claim 5, wherein the resin dispersed pigment ink composition is a cyan ink.

8. The ink jet recording method according to claim 5, further comprising:

a clear ink attachment step of discharging a clear ink composition containing resin particles by an ink jet method to attach the clear ink composition to the fabric, wherein the resin dispersed pigment ink attachment step is performed after the second ink attachment step, and the resin dispersed pigment ink composition is attached by the resin dispersed pigment ink attachment step, and then the clear ink composition is attached to a region to which the resin dispersed pigment ink composition is attached by the clear ink attachment step.

9. The ink jet recording method according to claim 8, wherein the clear ink composition contains anionic resin particles.

10. The ink jet recording method according to claim 1, wherein the reaction liquid composition contains a polyhydric alcohol, and a content of the polyhydric alcohol in the reaction liquid composition is 80% by mass or more with respect to a total amount of organic solvents in the reaction liquid composition.

11. The ink jet recording method according to claim 1, wherein a surface tension of the reaction liquid composition is 28 mN/m or more.

\* \* \* \* \*